(12) United States Patent
Khoshnevisan et al.

(10) Patent No.: US 11,528,730 B2
(45) Date of Patent: Dec. 13, 2022

(54) MULTI-TRANSMISSION TIME INTERVAL (TTI) GRANT SCHEDULING

(71) Applicant: QUALCOMM Incorporated, San Diego, CA (US)

(72) Inventors: Mostafa Khoshnevisan, San Diego, CA (US); Kapil Bhattad, Bangalore (IN); Jing Sun, San Diego, CA (US); Xiaoxia Zhang, San Diego, CA (US); Pravjyot Singh Deogun, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/914,037

(22) Filed: Jun. 26, 2020

(65) Prior Publication Data

US 2020/0413427 A1 Dec. 31, 2020

Related U.S. Application Data

(60) Provisional application No. 62/868,168, filed on Jun. 28, 2019.

(51) Int. Cl.
*H04W 72/12* (2009.01)
*H04W 72/04* (2009.01)
*H04W 72/14* (2009.01)

(52) U.S. Cl.
CPC ... *H04W 72/1268* (2013.01); *H04W 72/0466* (2013.01); *H04W 72/14* (2013.01)

(58) Field of Classification Search
None
See application file for complete search history.

(56) References Cited

U.S. PATENT DOCUMENTS

| 2017/0273056 A1* | 9/2017 | Papasakellariou .... H04W 52/44 |
| 2018/0160445 A1 | 6/2018 | Babaei et al. |
| 2018/0176937 A1 | 6/2018 | Chen et al. |
| 2019/0191486 A1* | 6/2019 | Myung ................ H04L 5/0044 |

FOREIGN PATENT DOCUMENTS

WO 2018107944 A1 6/2018

OTHER PUBLICATIONS

International Search Report and Written Opinion—PCT/US2020/040020—ISA/EPO—dated Dec. 15, 2020.
Partial International Search Report—PCT/US2020/040020—ISA/EPO—dated Sep. 10, 2020.
Qualcomm Incorporated: "CBG-Based (re)-Transmission", 3GPP Draft, R1-1718570, 3GPP TSG RAN WG1 Meeting #90bis, CBG-Based (re)-Transmission, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 3, 2017 (Oct. 3, 2017), XP051353137, pp. 1-11, Retrieved from the Internet: URL: http://www.3gpp.org/ftp/tsg_ran/WG1_RL1/TSGR1_90b/Docs/.

\* cited by examiner

*Primary Examiner* — Peter Chen
*Assistant Examiner* — Jeff Banthrongsack
(74) *Attorney, Agent, or Firm* — Patterson & Sheridan, LLP

(57) ABSTRACT

Certain aspects of the present disclosure provide techniques for scheduling physical uplink shared channels (PUSCHs) across multiple transmission time intervals (TTIs) using multi-TTI grants.

16 Claims, 16 Drawing Sheets

MULTI-TRANSMISSION TIME INTERVAL (TTI) GRANT SCHEDULING

PRIORITY CLAIM(S)

This application claims priority to and the benefit of U.S. Provisional Application No. 62/868,168, filed on Jun. 28, 2019, which is expressly incorporated by reference in its entirety as if fully set forth below and for all applicable purposes.

BACKGROUND

Field of the Disclosure

Aspects of the present disclosure relate to wireless communications, and more particularly, to techniques for scheduling physical uplink shared channels (PUSCHs) in multiple transmission time intervals (TTIs) using multi-TTI grants.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method of wireless communication by a user equipment (UE). The method generally includes receiving a configured grant (CG) uplink configuration to be used for one or more CG uplink transmissions; receiving downlink control information (DCI) scheduling a plurality of transmission time intervals (TTIs) for grant based uplink transmissions, wherein hybrid automatic repeat request (HARQ) process identifiers (IDs) are assigned to the grant based transmissions starting from a HARQ ID indicated in the DCI and by incrementing the HARQ IDs by one for each subsequent grant based transmission; determining at least one HARQ ID to be assigned for a corresponding set of grant based uplink transmissions is configured for a CG uplink transmission; receiving an indication of whether to assign HARQ IDs configured for the CG uplink transmissions for the grant based transmissions; assigning HARQ IDs for the set of grant based transmissions based on the received indication; and transmitting the grant based transmissions based on the assigned HARQ IDs.

Certain aspects of the present disclosure provide method for wireless communication by a base station (BS). The method generally includes transmitting a configured grant (CG) uplink configuration to be used for one or more CG uplink transmissions; transmitting a downlink control information (DCI) scheduling a plurality of transmission time intervals (TTIs) for grant based uplink transmissions, wherein hybrid automatic repeat request (HARQ) process identifiers (IDs) are to be assigned to the grant based uplink transmissions starting from a HARQ ID indicated in the DCI and by incrementing the HARQ IDs by one for each subsequent grant based transmission; determining at least one HARQ ID to be assigned for a corresponding set of grant based uplink transmissions is configured for a CG uplink transmission; transmitting an indication of whether to assign HARQ IDs configured for the CG uplink transmissions for the grant based transmissions; and receiving the grant based uplink transmissions based on the HARQ IDs assigned according to the indication.

Certain aspects of the present disclosure provide a method of wireless communication by a user equipment (UE). The method generally includes receiving information relating to a set of (HARQ) process identifiers (IDs) to be assigned for grant based uplink transmissions; receiving downlink control information (DCI) scheduling a plurality of transmission time intervals (TTIs) for the grant based uplink transmissions, wherein HARQ process IDs are assigned to the grant based uplink transmissions from the set of HARQ process IDs; and transmitting the grant based uplink transmissions based on the assigned HARQ IDs.

Certain aspects of the present disclosure provide a method of wireless communication by a user equipment (UE). The method generally includes transmitting information relating to a set of (HARQ) process identifiers (IDs) to be assigned for grant based uplink transmissions; transmitting downlink control information (DCI) scheduling a plurality of transmission time intervals (TTIs) for the grant based uplink transmissions, wherein HARQ process IDs are to be assigned to the grant based uplink transmissions from the set of HARQ process IDs; and receiving the grant based uplink transmissions based on the assigned HARQ process IDs.

Certain aspects of the present disclosure provide a method of wireless communication by a user equipment (UE). The method generally includes receiving a configured grant (CG) uplink configuration to be used for one or more CG uplink transmissions; receiving downlink control information (DCI) scheduling a plurality of uplink transmissions across a plurality of transmission time intervals (TTIs); determining a type of scrambling used to scramble a Cyclic Redundancy Portion (CRC) portion of the DCI; determining, based on the type of scrambling, a UE behavior relating to the CG uplink configuration; and transmitting the one or more CG uplink transmissions according to the CG uplink configuration based on the determined UE behavior.

Certain aspects of the present disclosure provide a method for wireless communication by a base station (BS). The method generally includes transmitting a configured grant (CG) uplink configuration to be used for one or more CG uplink transmissions; generating downlink control information (DCI) scheduling a plurality of uplink transmissions across a plurality of transmission time intervals (TTIs); determining a type of scrambling to be used to scramble a Cyclic Redundancy Portion (CRC) portion of the DCI; scrambling the DCI using the determined type of scrambling; transmitting the scrambled DCI; and receiving the one or more CG uplink transmissions according to the CG uplink configuration based on the type of scrambling.

Certain aspects of the present disclosure provide a method of wireless communication by a user equipment (UE). The method generally includes receiving downlink control information (DCI) according to a DCI format that can schedule a plurality of physical uplink shared channel (PUSCH) transmissions across a plurality of transmission time intervals (TTIs), wherein at least one field of the DCI is assigned one or more bits for each of a maximum number of PUSCH transmissions that can be scheduled by the DCI, determining that the DCI schedules a portion of the maximum number of PUSCH transmissions that can be scheduled by the DCI, and interpreting one or more unused bits assigned to the at least one field as code block group transmission information (CBGTI) for the scheduled PUSCH transmissions, the one or more unused bits corresponding to a remaining unscheduled portion of the maximum number of PUSCH transmissions.

Certain aspects of the present disclosure provide a method of wireless communication by a base station (BS). The method generally includes transmitting a downlink control information (DCI) according to a DCI format that can schedule a plurality of physical uplink shared channel (PUSCH) transmissions across a plurality of transmission time intervals (TTIs), wherein at least one field of the DCI is assigned one or more bits for each of a maximum number of PUSCH transmissions that can be scheduled by the DCI, the DCI scheduling a portion of the maximum number of PUSCH transmissions that can be scheduled by the DCI and transmitting code block group transmission information (CBGTI) for the scheduled PUSCH transmissions using one or more unused bits assigned to the at least one field, the one or more unused bits corresponding to a remaining unscheduled portion of the maximum number of PUSCH transmissions.

Certain aspects of the present disclosure provide a method of wireless communications by a user equipment. The method generally includes receiving downlink control information (DCI) scheduling a plurality of transmission time intervals (TTIs) for uplink transmissions, wherein the DCI includes a channel state information (CSI) request field including a request for a CSI report; and in response to receiving the request, transmitting the CSI report in at least one of the scheduled TTIs which satisfies a processing time requirement after receiving the request.

Certain aspects of the present disclosure provide a method of wireless communications by a base station (BS). The method generally includes transmitting downlink control information (DCI) scheduling a plurality of transmission time intervals (TTIs) for uplink transmissions, wherein the DCI includes a channel state information (CSI) request field including a request for a CSI report; and in response to the request, receiving the CSI report from a user equipment (UE) in at least one of the scheduled TTIs which satisfies a processing time requirement at the UE after receiving the request.

Certain aspects of the present disclosure provide an apparatus for wireless communications by a User Equipment (UE). The apparatus generally includes at least one processor and a memory coupled to the at least one processor. The at least one processor is generally configured to receive a configured grant (CG) uplink configuration to be used for one or more CG uplink transmissions; receive downlink control information (DCI) scheduling a plurality of transmission time intervals (TTIs) for grant based uplink transmissions, wherein hybrid automatic repeat request (HARQ) process identifiers (IDs) are assigned to the grant based transmissions starting from a HARQ ID indicated in the DCI and by incrementing the HARQ IDs by one for each subsequent grant based transmission; determine at least one HARQ ID to be assigned for a corresponding set of grant based uplink transmissions is configured for a CG uplink transmission; receive an indication of whether to assign HARQ IDs configured for the CG uplink transmissions for the grant based transmissions; assign HARQ IDs for the set of grant based transmissions based on the received indication; and transmit the grant based transmissions based on the assigned HARQ IDs.

Certain aspects of the present disclosure provide an apparatus for wireless communications by a Base Station (BS). The apparatus generally includes at least one processor and a memory coupled to the at least one processor. The at least one processor is generally configured to transmit a configured grant (CG) uplink configuration to be used for one or more CG uplink transmissions; transmit a downlink control information (DCI) scheduling a plurality of transmission time intervals (TTIs) for grant based uplink transmissions, wherein hybrid automatic repeat request (HARQ) process identifiers (IDs) are to be assigned to the grant based uplink transmissions starting from a HARQ ID indicated in the DCI and by incrementing the HARQ IDs by one for each subsequent grant based transmission; determine at least one HARQ ID to be assigned for a corresponding set of grant based uplink transmissions is configured for a CG uplink transmission; transmit an indication of whether to assign HARQ IDs configured for the CG uplink transmissions for the grant based transmissions; and receive the grant based uplink transmissions based on the HARQ IDs assigned according to the indication.

Certain aspects of the present disclosure provide an apparatus for wireless communications by a User Equipment (UE). The apparatus generally includes at least one processor and a memory coupled to the at least one processor. The at least one processor is generally configured to receive information relating to a set of (HARQ) process identifiers (IDs) to be assigned for grant based uplink transmissions; receive downlink control information (DCI) scheduling a plurality of transmission time intervals (TTIs) for the grant based uplink transmissions, wherein HARQ process IDs are assigned to the grant based uplink transmissions from the set of HARQ process IDs; and transmit the grant based uplink transmissions based on the assigned HARQ IDs.

Certain aspects of the present disclosure provide an apparatus for wireless communications by a Base Station (BS). The apparatus generally includes at least one processor and a memory coupled to the at least one processor. The at least one processor is generally configured to transmit information relating to a set of (HARQ) process identifiers (IDs) to be assigned for grant based uplink transmissions; transmit downlink control information (DCI) scheduling a plurality of transmission time intervals (TTIs) for the grant based uplink transmissions, wherein HARQ process IDs are to be assigned to the grant based uplink transmissions from the set of HARQ process IDs; and receive the grant based uplink transmissions based on the assigned HARQ process IDs.

Certain aspects of the present disclosure provide an apparatus for wireless communications by a User Equipment (UE). The apparatus generally includes at least one processor and a memory coupled to the at least one processor. The at least one processor is generally configured to receive a configured grant (CG) uplink configuration to be used for one or more CG uplink transmissions; receive downlink control information (DCI) scheduling a plurality of transmission time intervals (TTIs) for transmissions; determine a type of scrambling used to scramble a Cyclic Redundancy Check (CRC) portion of the DCI; determine, based on the type of scrambling, a UE behavior relating to the CG uplink configuration; and transmit the one or more CG uplink transmissions according to the CG uplink configuration based on the determined UE behavior.

Certain aspects of the present disclosure provide an apparatus for wireless communications by a Base Station (BS). The apparatus generally includes at least one processor and a memory coupled to the at least one processor. The at least one processor is generally configured to transmit a configured grant (CG) uplink configuration to be used for one or more CG uplink transmissions; generate downlink control information (DCI) scheduling a plurality of transmission time intervals (TTIs) for uplink transmissions; determine a type of scrambling to be used to scramble a Cyclic Redundancy Portion (CRC) portion of the DCI; scramble the DCI using the determined type of scrambling; transmit the scrambled DCI; and receive the one or more CG uplink transmissions according to the CG uplink configuration based on the type of scrambling.

Certain aspects of the present disclosure provide an apparatus for wireless communications by a User Equipment (UE). The apparatus generally includes at least one processor and a memory coupled to the at least one processor. The at least one processor is generally configured to receive downlink control information (DCI) according to a multi-transmission time interval (TTI) DCI format that can schedule a plurality of TTIs for uplink transmissions, wherein at least one field of the DCI is assigned one or more bits for each of a maximum number of TTIs that can be scheduled by the DCI; determine that the DCI schedules a portion of the maximum number of TTIs that can be scheduled by the DCI; and interpret one or more unused bits assigned to the at least one field as code block group transmission information (CBGTI) for the scheduled TTIs, the one or more unused bits corresponding to a remaining unscheduled portion of the maximum number of TTIs.

Certain aspects of the present disclosure provide an apparatus for wireless communications by a Base Station (BS). The apparatus generally includes at least one processor and a memory coupled to the at least one processor. The at least one processor is generally configured to transmit downlink control information (DCI) according to a multi-transmission time interval (TTI) DCI format that can schedule a plurality of TTIs for uplink transmissions, wherein at least one field of the DCI is assigned one or more bits for each of a maximum number of TTIs that can be scheduled by the DCI, the DCI scheduling a portion of the maximum number of TTIs that can be scheduled by the DCI; and transmit code block group transmission information (CBGTI) for the scheduled TTIs using one or more unused bits assigned to the at least one field, the one or more unused bits corresponding to a remaining unscheduled portion of the maximum number of TTIs.

Certain aspects of the present disclosure provide an apparatus for wireless communications by a User Equipment (UE). The apparatus generally includes at least one processor and a memory coupled to the at least one processor. The at least one processor is generally configured to receive downlink control information (DCI) scheduling a plurality of transmission time intervals (TTIs) for uplink transmissions, wherein the DCI includes a channel state information (CSI) request field including a request for a CSI report; and in response to receiving the request, transmit the CSI report in at least one of the scheduled TTIs which satisfies a processing time requirement after receiving the request.

Certain aspects of the present disclosure provide an apparatus for wireless communications by a Base Station (BS). The apparatus generally includes at least one processor and a memory coupled to the at least one processor. The at least one processor is generally configured to transmit downlink control information (DCI) scheduling a plurality of transmission time intervals (TTIs) for uplink transmissions, wherein the DCI includes a channel state information (CSI) request field including a request for a CSI report; and in response to the request, receive the CSI report from a user equipment (UE) in at least one of the scheduled TTIs which satisfies a processing time requirement at the UE after receiving the request.

Aspects of the present disclosure provide means for, apparatus, processors, and computer-readable mediums for performing techniques and methods that may be complementary to the operations by the UE described herein, for example, by a BS.

To the accomplishment of the foregoing and related ends, the one or more aspects comprise the features hereinafter fully described and particularly pointed out in the claims.

The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
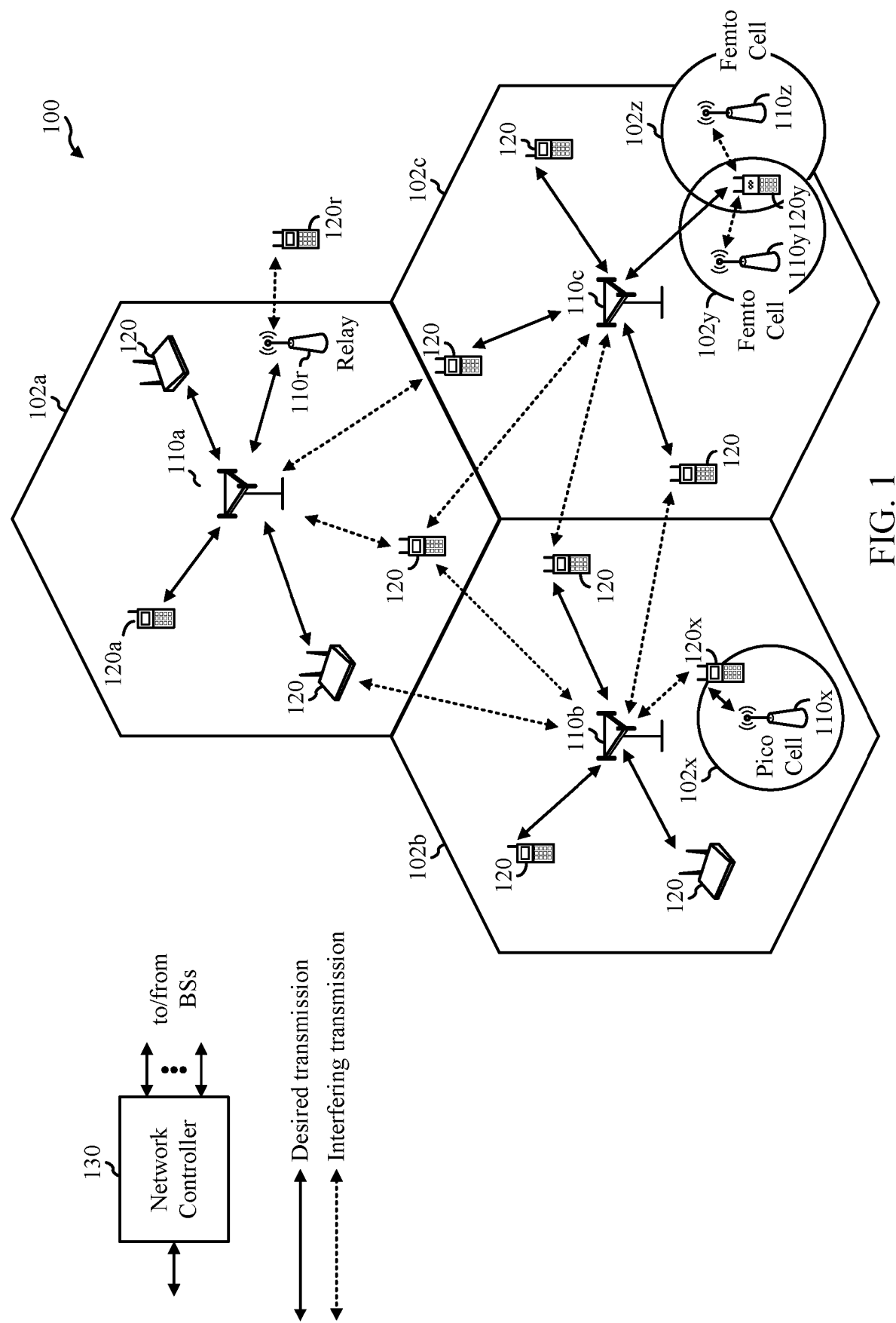
FIG. 1 is a block diagram conceptually illustrating an example telecommunications system, in accordance with certain aspects of the present disclosure.

A Multi-Transmission Time Interval (Multi-TTI) grant generally refers to a single grant (e.g., Downlink/Uplink grant) that schedules multiple transport blocks (TBs) (e.g., PDSCH or PUSCH) on multiple TTIs. A Multi-TTI grant scheduling multiple PUSCH transmissions across multiple TTIs may be referred to as a Multi-TTI PUSCH grant or a Multi-PUSCH grant. Similarly, a Multi-TTI grant scheduling multiple PDSCH transmissions across multiple TTIs may be referred to as a Multi-PDSCH grant.

In an aspect, a TTI includes a slot or a mini-slot of an NR subframe. Multi-TTI grants are particularly useful for multi-TTI PUSCH grants in NR based access to unlicensed spectrum (NRU). For example, without multi-TTI PUSCH grants, multiple downlink portions may have to be used for transmitting multiple PUSCH grants, which would not only cause additional overhead but would also involve multiple switches between downlink and uplink. Since NRU uses Listen-Before-Talk (LBT) to gain access to a medium, switches between downlink and uplink may potentially lead to loss of medium.

Aspects of the present disclosure describe techniques for scheduling a plurality of TTIs using multi-TTI grants.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3 GPP2).

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be an NR system (e.g., a 5G NR For example, the wireless communication network 100 may include UE 120 configured to perform operations described below with reference to FIGS. 5, 7, 9, 12, and/or 14, to process a DCI that schedules transmissions across multiple TTIs. Similarly, the wireless communication network 100 may include BS 110 configured to perform operations described below with reference to FIGS. 6, 8, 10, 13, and/or 15, to generate and send a DCI (to a UE 120) that schedules transmissions across multiple TTIs.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling qentity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
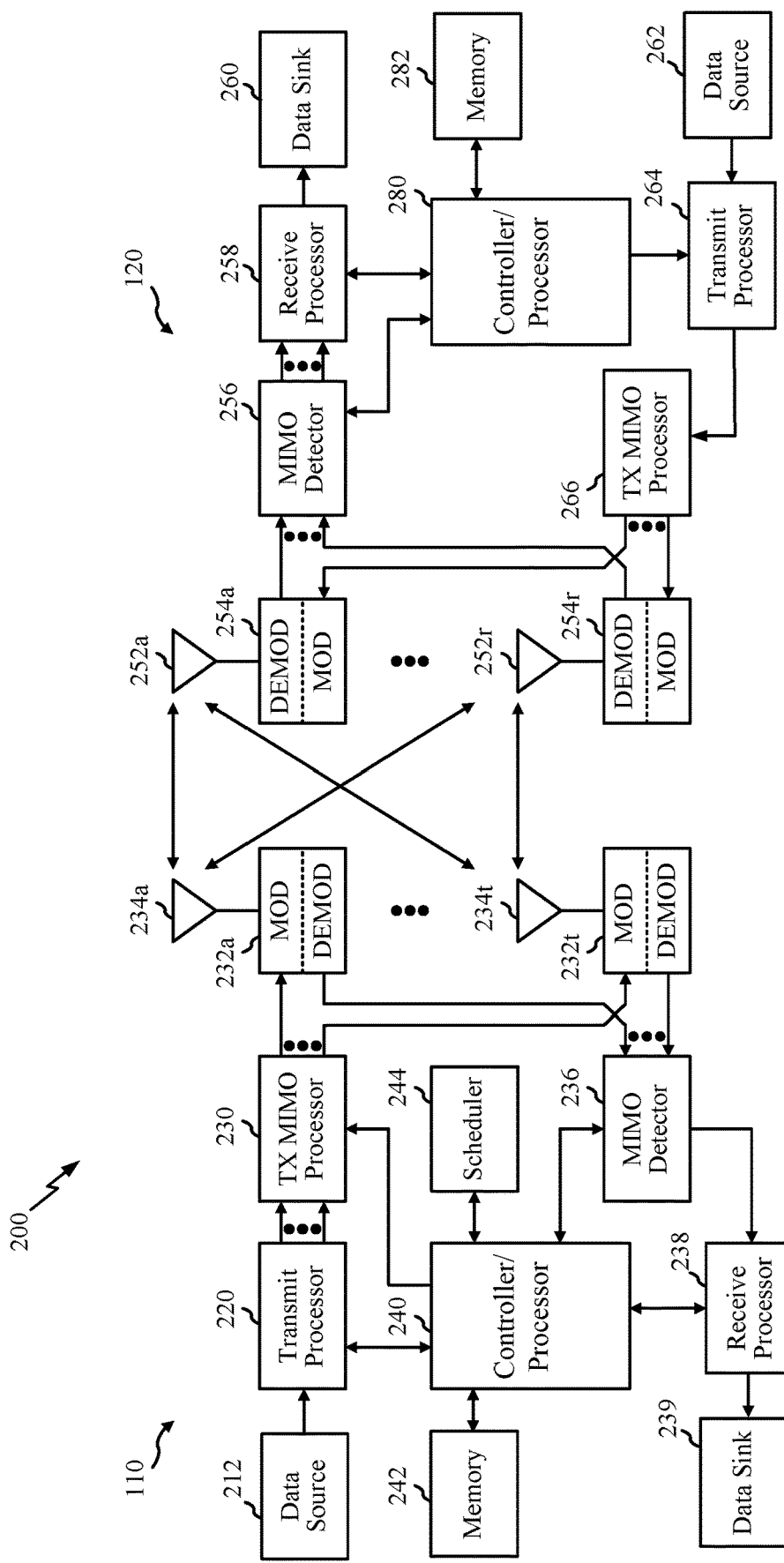
FIG. 2 is a block diagram illustrating an example architecture of a distributed radio access network (RAN), in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 may be configured to perform operations described below with reference to FIGS. 5, 7, 9, 12 and/or 14 to process a DCI that schedules transmissions across multiple TTIs. Similarly, antennas 234, processors 220, 230, 238, and/or controller/processor 240 of the BS 110 may be configured tot perform operations described below with reference to FIGS. 6, 8, 10, 13, and/or 15, to generate and send a DCI (to a UE 120) that schedules transmissions across multiple TTIs.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Figure 3:
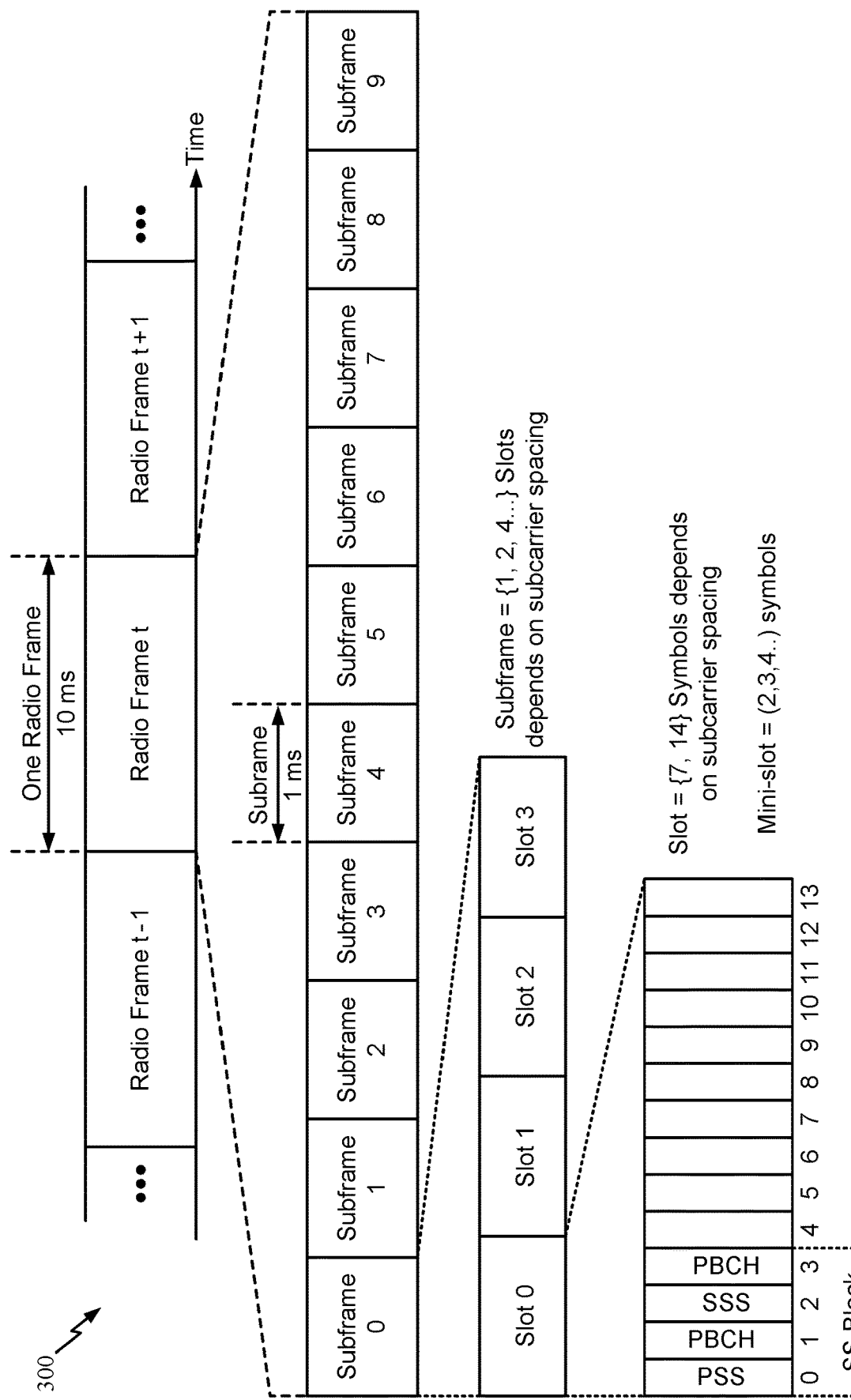
FIG. 3 illustrates an example of a frame format for a telecommunication system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

Multi-Tti Grant Scheduling

As noted above, a Multi-Transmission Time Interval (Multi-TTI) grant generally refers to a single grant (e.g., Downlink/Uplink grant) that schedules multiple transport blocks (TBs) (e.g., PDSCH or PUSCH) on multiple TTIs. In an aspect, a TTI includes a slot or a mini-slot of an NR subframe. Multi-TTI grants are particularly useful for multi-TTI PUSCH grants in NR based access to unlicensed spectrum (NRU). For example, without multi-TTI PUSCH grants, multiple downlink portions may have to be used for transmitting multiple PUSCH grants, which would not only cause additional overhead but would also involve multiple switches between downlink and uplink. Since NRU uses Listen-Before-Talk (LBT) to gain access to a medium, switches between downlink and uplink may potentially lead to loss of medium.

In certain aspects, a multi-TTI grant may have a large size as some of the scheduling parameters are not common across the scheduled slots/mini-slots, and need to be indicated for each slot in the grant. Examples of such parameters include but are not limited to Redundancy Version (RV), New Data Indicator (NDI), Code Block Group Transmission Information (CBGTI) and HARQ Process identifier (ID). For example, for a code block group (CBG) based transmission with 8 CBGs per slot and a multi-TTI grant scheduling 8 slots, 64 bits are required in the DCI just for the CBGTI parameter.

In certain aspects, certain concepts relating to multi-TTI grants in Licensed-Assisted Access (LAA) may be leveraged for scheduling using multi-TTI grants in NR.

Multi-TTI grant in LAA uses DCI formats OB/4B in accordance with 3GPP LTE specifications. The LTE specifications include several definitions for multi-TTI UL grants. According to the LTE specifications, a "maxNumberOfSchedSubframes" parameter is configured via Radio Resource Control (RRC) signaling. This parameter configures a maximum number of TTIs (e.g., 2 or 4 subframes) that may be scheduled by a multi-TTI grant. DCI is used to dynamically indicate how many TTIs or subframes are actually scheduled by a particular multi-TTI grant DCI. In an aspect, the DCI uses 1 bit or 2 bits for this dynamic indication based on the maximum number of scheduled TTIs configured via RRC signaling being 2 or 4 TTIs respectively. In an aspect, the DCI size is independent of the number of TTIs scheduled dynamically, and is only a function of the maximum number of scheduled TTIs that is semi-statically configured via RRC signaling. In an aspect, UL grant indicates the HARQ process ID of the first scheduled TTI/subframe. The HARQ process IDs for the remaining scheduled subframes are determined by incrementing the HARQ process ID for every subframe. In an aspect, the RVID is selected between RVIDs 0 or 2. Thus, only one bit per HARQ process is used to indicate the RVID in the UL grant. Since each scheduled TTI is assigned a different HARQ process, the length of the RV field is equal to the "maxNumberOfSchedSubframes" parameter. In an aspect, NDI is indicated per HARQ process using one bit per HARQ process. Thus, the length of the NDI field is also equal to the "maxNumberOfSchedSubframes" parameter.

In certain aspects, some of the above concepts that apply to LAA may be advantageously leveraged for scheduling using multi-TTI grants in other types of systems (e.g., NR).

In certain aspects, a RRC parameter N (e.g., N=maxNumberOfTx) may be defined that defines the maximum number of slots and/or mini-slots that are allowed to be scheduled by a multi-TTI grant. In an aspect, each TTI includes a slot or a mini-slot. In an aspect, assuming one transmission (e.g., PUSCH) per slot/mini-slot, the parameter N defines a maximum number of transmissions (e.g., maximum number of PUSCHs), wherein the transmissions include new transmissions and retransmissions. In an aspect, this parameter N is similar to the "maxNumberOfSchedSubframes" parameter in LAA.

In an aspect, similar to the LAA design, the DCI for the multi-TTI grant may dynamically indicate an actual number of slots/mini-slots (n<=N) scheduled by the multi-TTI grant. Again, assuming one transmission per slot, the DCI dynamically indicates the actual number of transmissions (including new transmissions and/or retransmissions) scheduled by the multi-TTI grant. In an aspect, each transmission is assigned a different HARQ process, and thus, a different corresponding HARQ process ID. Thus, every slot/mini-slot scheduled by the multi-TTI grant corresponds to a different new transmission/retransmission and an associated HARQ process ID. For example, if 5 slots and/or mini-slots are scheduled by the DCI, HARQ process IDs 1-5 are assigned to the transmissions scheduled in the slots/mini-slots in ascending order wherein HARQ process ID #1 is assigned to the transmission scheduled in the first slot/mini-slot and HARQ process ID #5 is assigned to the transmission scheduled in the fifth slot/mini-slot. In an aspect, similar to LAA design, the multi-TTI grant may indicate the HARQ process ID of the first scheduled TTI (e.g., slot/mini-slot). HARQ process IDs for the remaining scheduled slots/mini-slots may be determined by incrementing the HARQ process ID for every slot/mini-slot in the scheduled order (with modulo operation as needed).

In an aspect, the NDI field length (e.g., bit-width) is equal to the maximum number of transmissions N allowed to be scheduled by the multi-TTI grant, one bit of the NDI field for each HARQ process ID.

In an aspect, if CBG based re-transmission is supported for multi-TTI grants in NR (e.g., multi-TTI UL grants), CBGTI may be signaled per re-transmitted PUSCH, per PUSCH or only for a fixed number of PUSCHs.

NR standards define a Channel State Information (CSI) request field in the DCI that requests a CSI feedback. The CSI request field generally applies to a single PUSCH transmission. In the context of multi-TTI grants, there is no agreement in NR regarding a relation between timing of the triggered CSI-RS and the PUSCH carrying the CSI feedback, and how to determine which PUSCH of the multiple scheduled PUSCHs carries the CSI feedback.

As noted above, similar to LAA, it is likely that NR will agree on having a RRC configuration parameter N, which determines the maximum number of allowed PUSCHs in a multi-TTI uplink grant, while the actual number n<=N scheduled PUSCHs is dynamically signaled in the DCI, and certain fields (e.g. NDI and RV) will have length as a function of N.

NR defines two types of uplink grants, namely, uplink (UL) configured grant (CG) and grant-based UL. UL CG transmissions are generally configured via RRC signaling. Grant-based UL transmissions are generally scheduled via DCI grants.

In certain aspects, when one or more UL CG processes are configured, some of the available HARQ process IDs are generally assigned to those UL CG processes. In accordance with 3GPP Release 15, HARQ process IDs for grant-based UL transmissions are indicated via DCI. For UL CG transmissions, HARQ process IDs are determined from timing with modulo operation to a number of configured HARQ processes represented by the parameter nrofHARQ-Processes. In an aspect, the parameter nrofHARQ-Processes is configured via RRC signaling. For example, the HARQ process ID for UL CG is given by:

HARQ Process ID=[floor(CURRENT_symbol/periodicity)] modulo nrofHARQ-Processes, where CURRENT_symbol=(SFN×numberOfSlotsPerFrame×numberOfSymbolsPerSlot+slot number in the frame numberOfSymbolsPerSlot+symbol number in the slot).

For example, if nrofHARQ-Processes=4, consecutive UL CG transmissions will have HARQ process IDs of e.g. 0, 1, 2, 3, 0, 1, 2, 3, . . . Note that total number of available HARQ process IDs may be larger than 4 (e.g., up to 16 HARQ process IDs). However, only first four of the available HARQ process IDs are used for UL CG transmission occasions according to configured parameter nrofHARQ-Processes. Thus, generally consecutive HARQ process IDs are assigned for each of the UL CG HARQ processes starting from the lowest HARQ process ID (e.g., starting from HARQ process ID=0).

In certain aspects, the standards allow grant-based uplink to use HARQ IDs configured for UL CG. However, in such a case, grant-based UL generally has priority over UL CG. For example, a transmission occasion corresponding to UL CG with a HARQ process ID used by a grant-based transmission is not transmitted within a pre-configured timer to avoid collision with the grant-based transmission.

In certain aspects, when a single-TTI PUSCH transmission is scheduled for grant-based UL, only one corresponding HARQ process ID needs to be assigned for the single-TTI PUSCH transmission. Thus, the gNB generally has control over which HARQ process ID (e.g., out of 16 configured HARQ process IDs) it assigns for the single-TTI transmission and signals the same in the DCI. Thus, the gNB can choose to either select a HARQ ID that is not allocated for UL CG or can select a HARQ ID that is allocated to UL CG.

However, in case of grant-based multi-TTI PUSCH transmission (e.g., scheduled by a multi-TTI uplink grant DCI), the control over which HARQ process IDs are assigned for the multiple scheduled grant-based transmissions is much less as compared to single-TTI transmission. A reason for the reduced control over HARQ process ID assignment for multi-TTI grants is that, as noted above, the multi-TTI DCI signals HARQ process ID for the first scheduled PUSCH transmission and the HARQ process ID is incremented by one for each subsequent PUSCH transmission in the scheduled order (with modulo operation as needed). This mechanism for HARQ process ID assignment for grant-based transmissions may result in certain grant-based PUSCH transmissions being assigned HARQ process IDs that are already configured for UL CG transmission.

Figure 4:
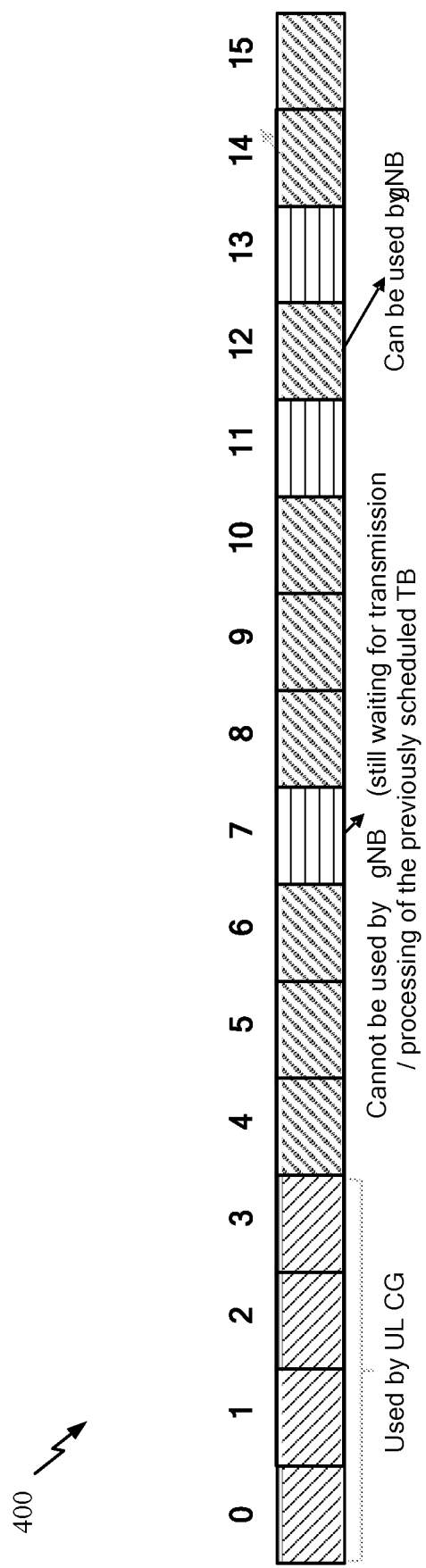
FIG. 4 illustrates an example assignment 400 of HARQ process IDs for UL CG and grant-based transmissions.

FIG. 4 illustrates an example assignment 400 of HARQ process IDs for UL CG and grant-based transmissions. FIG. 4 shows a total of 16 configured HARQ process IDs (HARQ process ID #0-15) that can be assigned for UL CG and grant-based transmissions. Example assignment 400 assumes that 4 HARQ processes are configured for UL CG (e.g., nrofHARQ-Processes=4). Thus, as shown in FIG. 4, HARQ process IDs 0-3 are assigned to the 4 UL CG transmissions. Further, example assignment 400 assumes that HARQ process IDs 7, 11 and 13 are unavailable for assignment by the gNB, for example, as the gNB may still be waiting for a previous transmission with these HARQ process IDs or due to processing of previously scheduled TBs with these HARQ process IDs.

Now, assuming that the multi-TTI grant schedules 4 PUSCH transmissions, and given that the current standards require consecutive HARQ process IDs to be assigned for multi-TTI grant-based transmissions, the gNB cannot avoid assigning HARQ process IDs to the 4 grant-based PUSCH transmissions without assigning one or more HARQ process IDs 0-3 configured for the UL CG. For example, while the gNB can assign HARQ process IDs (14, 15, 0, 1) for the 4 grant-based PUSCH transmissions, the current standards do not allow assigning HARQ process IDs (14, 15, 4, 5) to the grant-based PUSCH transmissions. However, allowing the gNB to assign non-consecutive HARQ process IDs (e.g., 14, 15, 4, 5) to the grant-based PUSCH transmissions may be beneficial if the gNB wishes not to use HARQ process IDs configured for the UL CG transmissions, for example, for avoiding collision of UL CG transmission occasions with grant-based UL transmission occasions.

In certain aspects, for assigning HARQ process IDs for multi-TTI PUSCH transmissions scheduled by multi-TTI grant (grant-based transmissions), the gNB may be allowed to either use HARQ process IDs configured for CG UL or not use HARQ process IDs configured for CG UL. In an aspect, the gNB may indicate to the UE whether the UE, while assigning HARQ process IDs to grant-based UL transmissions after receiving a multi-TTI grant, is to skip HARQ process IDs corresponding to CG UL transmissions or not to skip HARQ process IDs corresponding to UL CG transmissions.

Figure 5:
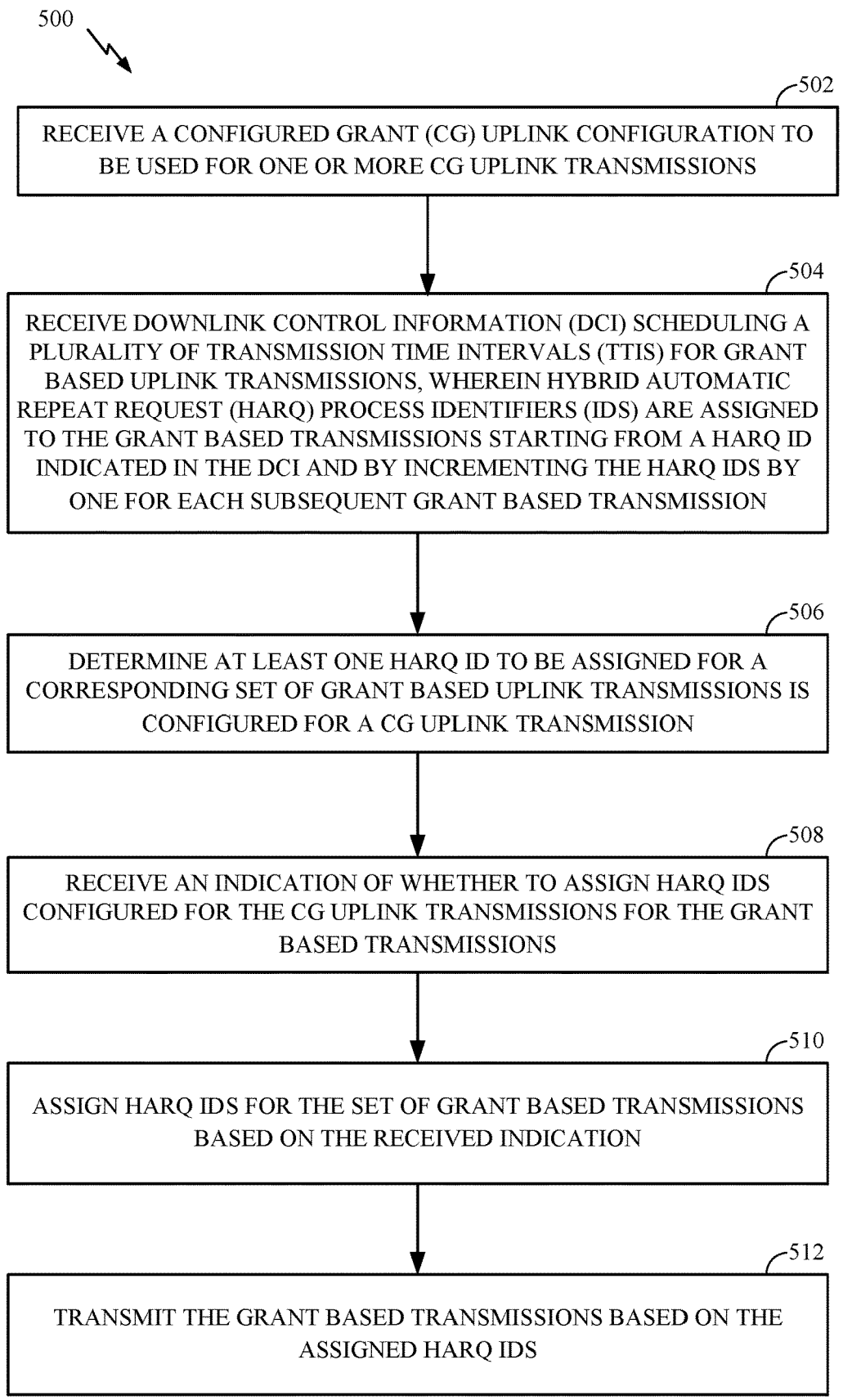
FIG. 5 illustrates example operations 500 performed by a UE for assigning HARQ process IDs for grant-based uplink transmissions (e.g., PUSCH transmissions), in accordance with certain aspects of the present disclosure.

FIG. 5 illustrates example operations 500 performed by a UE for assigning HARQ process IDs for grant-based uplink transmissions (e.g., PUSCH transmissions), in accordance with certain aspects of the present disclosure.

Operations 500 begin, at 502, by receiving an UL CG configuration to be used for one or more UL CG transmissions.

At 504, the UE receives DCI scheduling a plurality of TTIs for grant-based UL transmissions, wherein HARQ process IDs are assigned to the grant-based transmissions starting from a HARQ ID indicated in the DCI and by incrementing the HARQ IDs by one for each subsequent grant-based transmission.

At 506, the UE determines at least one HARQ ID to be assigned for a corresponding set of grant-based uplink transmissions is configured for a UL CG transmission.

At 508, the UE receives an indication of whether to assign HARQ IDs configured for the UL CG transmissions for the grant-based transmissions.

At 510, the UE assigns HARQ IDs for the set of grant-based transmissions based on the received indication.

At 512, the UE transmits the grant-based uplink transmissions based on the assigned HARQ IDs.

Figure 6:
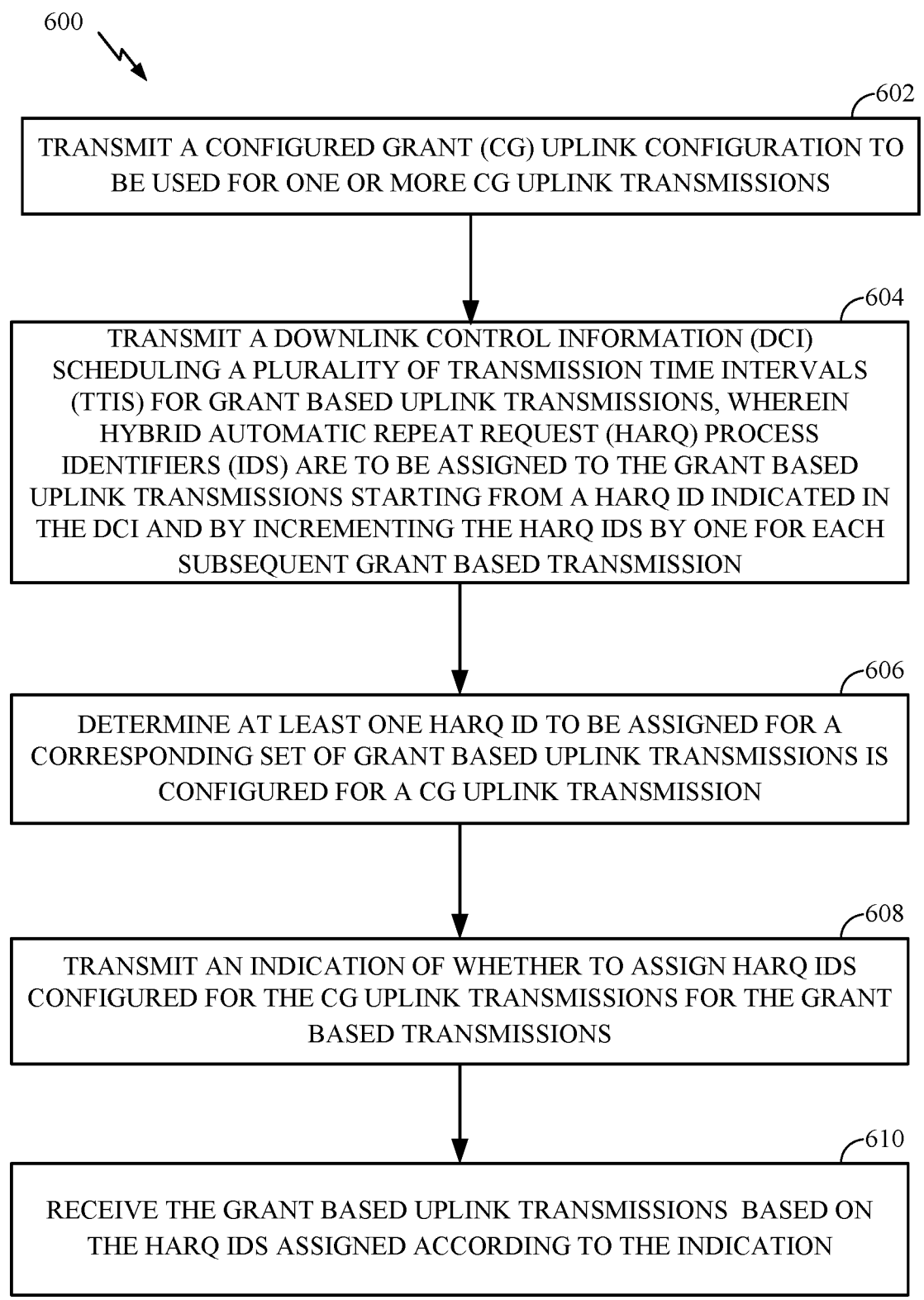
FIG. 6 illustrates example operations 600 performed by a base station (BS) (e.g., gNB, TP, DU etc.) for assigning HARQ process IDs for grant-based uplink transmissions (e.g., PUSCH transmissions), in accordance with certain aspects of the present disclosure.

FIG. 6 illustrates example operations 600 performed by a base station (BS) (e.g., gNB, TP, DU etc.) for assigning HARQ process IDs for grant-based uplink transmissions (e.g., PUSCH transmissions), in accordance with certain aspects of the present disclosure.

Operations 600 begin, at 602, by transmitting a UL CG configuration to be used for one or more UL CG transmissions.

At 604, the BS transmits a DCI scheduling a plurality of TTIs for grant-based UL transmissions, wherein HARQ process IDs are to be assigned to the grant-based UL transmissions starting from a HARQ ID indicated in the DCI and by incrementing the HARQ IDs by one for each subsequent grant based transmission.

At 606, the BS determines at least one HARQ ID to be assigned for a corresponding set of grant based uplink transmissions is configured for a CG uplink transmission.

At 608, the BS transmits an indication of whether to assign HARQ IDs configured for the CG uplink transmissions for the grant based transmissions.

At 610, the BS receives the grant-based uplink transmissions based on the HARQ IDs assigned according to the indication.

In an aspect, when the UE receives an indication to assign HARQ IDs configured for the UL CG transmissions for the grant-based transmissions (i.e., not skip HARQ IDs configured for UL CG), the UE assigns the at least one HARQ ID configured for UL CG to the set of grant-based transmissions. Additionally or alternatively, the UE does not transmit the UL CG transmissions corresponding to the at least one HARQ ID assigned for grant-based transmissions. For example, with reference to the example assignment 400 as shown in FIG. 4, for scheduling the 4 grant-based PUSCH transmissions via multi-TTI DCI, if the starting HARQ ID signaled by the DCI is 14, HARQ ID assignments for the scheduled grant-based PUSCH transmissions can be (14, 15, 0, 1). In this context, the UE may not transmit UL CG transmissions with HARQ IDs 0 and 1.

In an aspect, when the indication comprises an indication to not assign HARQ IDs configured for the CG uplink transmissions for the grant based transmissions (i.e., skip UL CG HARQ IDs), the UE skips the at least one HARQ ID configured for UL CG while assigning HARQ IDs to the grant-based transmissions. For example, with reference to the example assignment 400 as shown in FIG. 4, for scheduling the 4 grant-based PUSCH transmissions via multi-TTI DCI, if the starting HARQ ID signaled by the DCI is 14, HARQ ID assignments for the scheduled grant-based PUSCH transmissions can be (14, 15, 4, 5). In this context, as there is no conflict between HARQ IDs configured for the CG UL transmissions and those assigned for grant-based transmissions, all four UL CG transmissions can be transmitted in addition to transmitting all four grant-based UL transmissions.

In an aspect, the UE skips HARQ IDs configured for one or more UL CG transmissions, only when the UL CG transmissions are indicated as active. In an aspect, the UE receives an indication from the gNB regarding whether one or more configured UL CG transmissions are active or not. For example, according to the NR standards, for type 1 UL CG, activation is indicated via RRC signaling, and type 2 UL CG, activation is indicated via DCI. In an aspect, when UL CG is deactivated, the UE does not skip HARQ process IDs configured for UL CG when assigning HARQ IDs for grant-based UL transmissions, even though the UE may have received an explicit indication to skip UL CG HARQ IDs.

In an aspect, the gNB may indicate whether or not to skip HARQ process IDs configured for UL CG via at least one of RRC signaling or DCI (e.g., via multi-TTI grant DCI).

3GPP Release 15 defines a maximum of on CG configuration. However, multiple CG configurations (e.g., up to 12 CG configurations) are agreed in Release 16. In this context, if multiple CG configurations are configured, the skipping/not skipping UL CG HARQ process IDs can be indicated per CG configuration. Additionally or alternatively, if a particular CG configuration (e.g., of multiple configured CG configurations) is not active, skipping is not performed for HARQ process IDs corresponding to the particular CG configuration.

In certain aspects, as an alternative to indicating skipping/not skipping UL CG HARQ IDs, a set of HARQ process IDs can be configured (e.g., via RRC signaling) for multi-TTI grant. HARQ process IDs for grant-based transmissions are assigned from the configured set of HARQ process IDs. In an aspect, the gNB avoids including HARQ IDs configured for UL CG in the set of HARQ process IDs, thus avoiding collision with UL CG transmissions. Additionally, configuring a set of HARQ process IDs for assigning to grant-based transmissions provides more control over a HARQ ID sequence signaled in the multi-TTI grant. In an aspect, the set of HARQ process IDs is applicable only for grant-based transmissions scheduled by multi-TTI grants.

Figure 7:
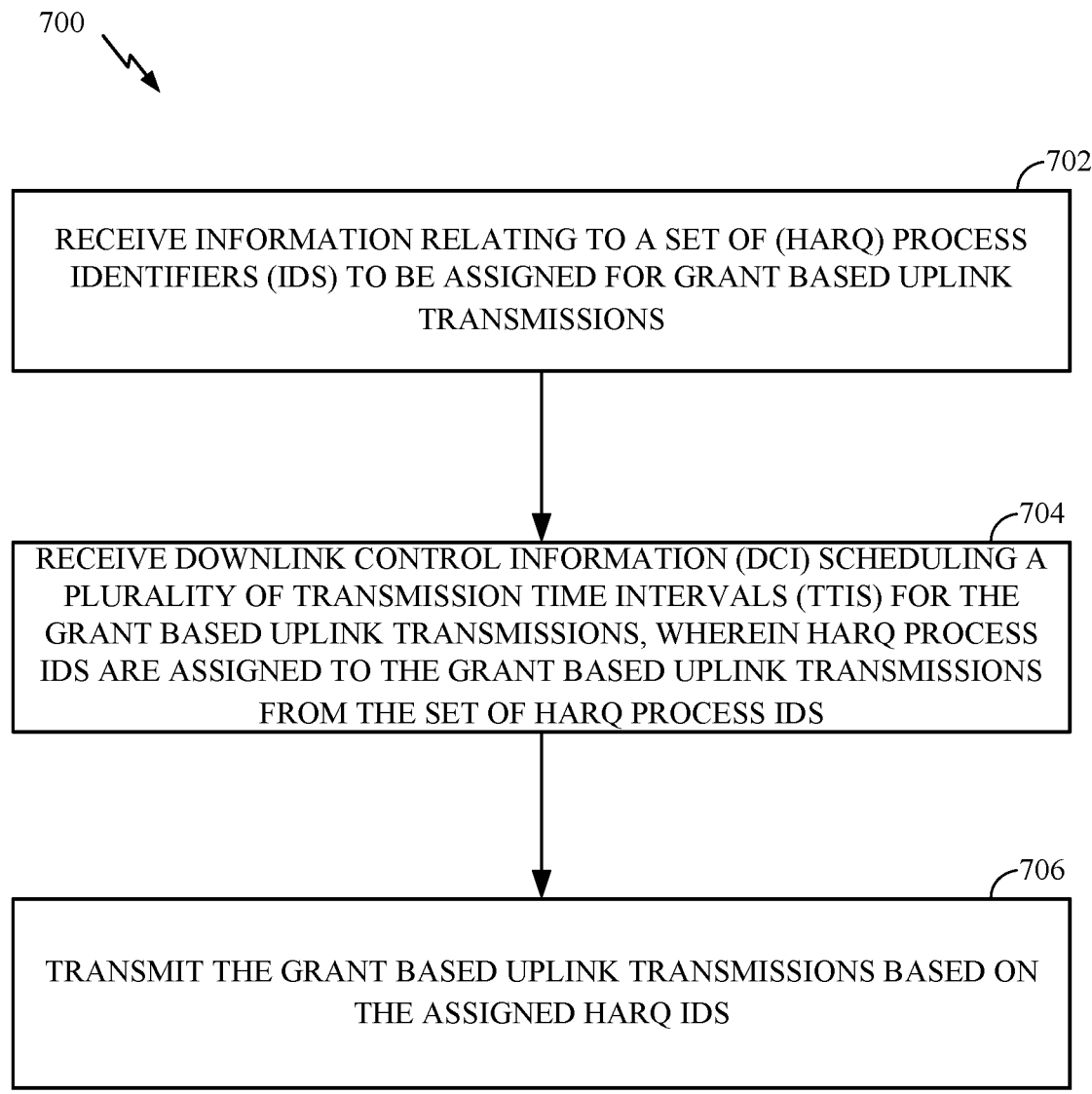
FIG. 7 illustrates example operations 700 performed by a UE for assigning HARQ process IDs for grant-based transmissions based on a set of configured HARQ process IDs, in accordance with certain aspects of the present disclosure.

FIG. 7 illustrates example operations 700 performed by a UE for assigning HARQ process IDs for grant-based transmissions based on a set of configured HARQ process IDs, in accordance with certain aspects of the present disclosure.

Operations 700 begin, at 702, by receiving information relating to a set of HARQ process IDs to be assigned for grant-based uplink transmission.

At 704, the UE receives DCI scheduling a plurality of TTIs for the grant-based uplink transmissions, wherein HARQ process IDs are assigned to the grant-based uplink transmissions from the set of HARQ process IDs.

At 706, the UE transmits the grant-based uplink transmissions based on the assigned HARQ IDs.

Figure 8:
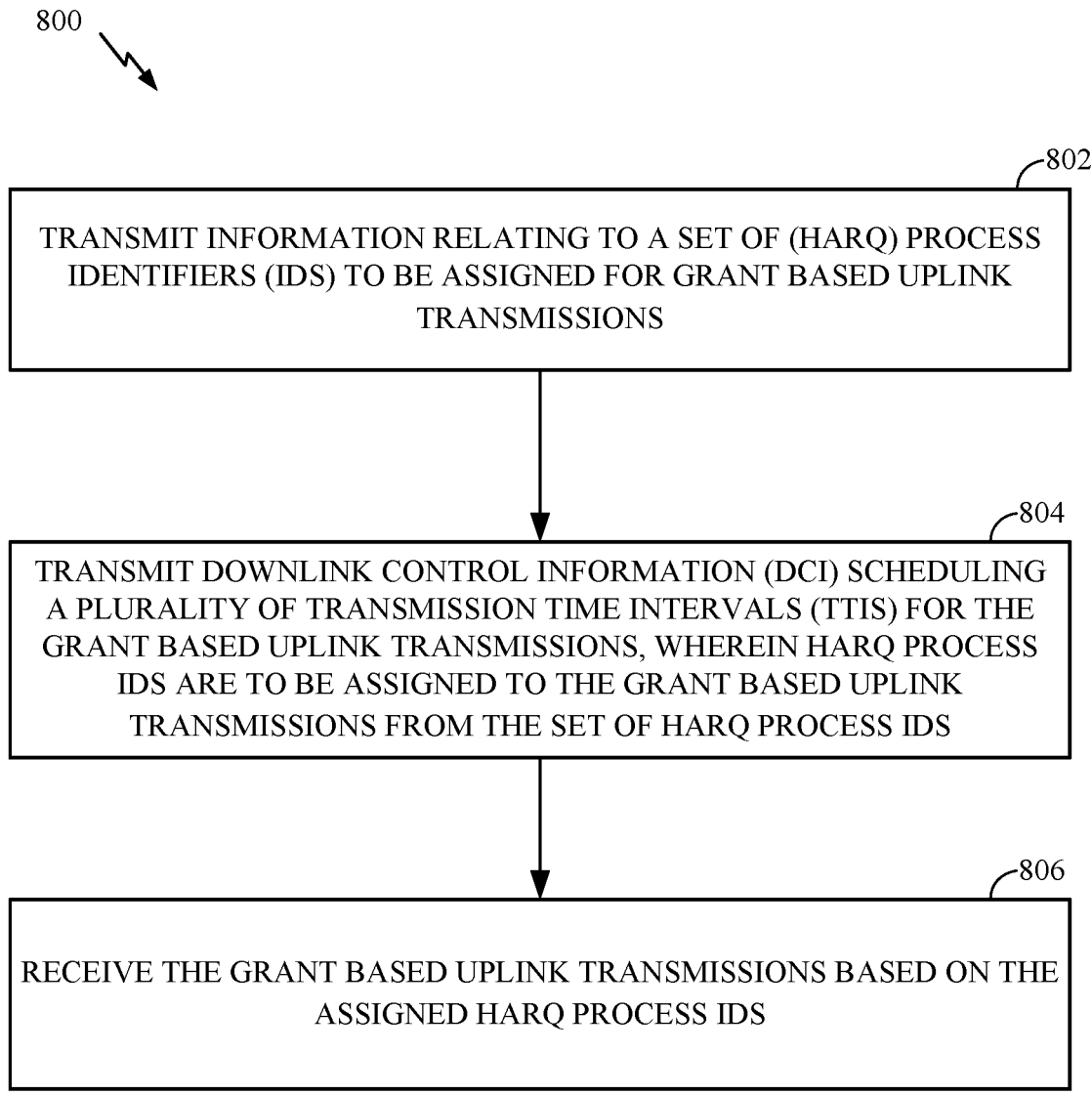
FIG. 8 illustrates example operations 800 performed by a BS (e.g., gNB, TP, DU etc.) for assigning HARQ process IDs for grant-based transmissions based on a set of configured HARQ process IDs, in accordance with certain aspects of the present disclosure.

FIG. 8 illustrates example operations 800 performed by a BS (e.g., gNB, TP, DU etc.) for assigning HARQ process IDs for grant-based transmissions based on a set of configured HARQ process IDs, in accordance with certain aspects of the present disclosure.

Operations 800 begin, at 802, by transmitting information relating to a set of HARQ process IDs to be assigned for grant-based uplink transmissions.

At 804, the BS transmits DCI scheduling a plurality of TTIs for the grant-based uplink transmissions, wherein HARQ process IDs are to be assigned to the grant-based uplink transmissions from the set of HARQ process IDs.

At 806, the BS receives the grant-based uplink transmissions based on the assigned HARQ process IDs.

In an aspect, the set of HARQ IDs do not include HARQ IDs assigned for UL CG transmissions. In an aspect, the UE receives information regarding the set of HARQ process IDs from the gNB via RRC signaling. In an aspect, the set of HARQ process IDs is used to assign HARQ process IDs only for grant-based transmissions scheduled by a multi-TTI grant.

3GPP Release 15 defines UE behavior for grant-based UL and UL CG when the UE receives a DCI scheduling a single TTI, based on how the Cyclic Redundancy Check (CRC) portion (e.g., CRC bits) of the DCI is scrambled. In an aspect, scrambling the DCI generally includes scrambling a Cyclic Redundancy Check (CRC) portion of the DCI with a Cell-Radio Network Temporary Identifier (C-RNTI) or a Configured Scheduling-Radio Network Temporary Identifier (CS-RNTI). It may be noted that references to scrambling the DCI or scrambled DCI in the present disclosure includes scrambling the CRC portion of the DCI or scrambled CRC of the DCI respectively.

According to 3GPP Release 15, when the received DCI is scrambled with C-RNTI, the DCI is meant for scheduling grant-based UL and the HARQ ID for the scheduled UL transmission is indicated in the DCI. If a grant based transmission/occasion as scheduled by the DCI overlaps with an UL CG transmission/occasion, the grant-based transmission takes priority and the CG UL transmission is not transmitted. Further, if the HARQ ID indicated in the DCI is one of the HARQ IDs configured for UL CG, the UL CG transmission corresponding to the same HARQ ID is not transmitted within a pre-configured time period, even if the UL CG transmission occasion corresponding to the HARQ ID does not overlap with the grant-based transmission occasion.

According to 3GPP Release 15, when the received DCI is scrambled with CS-RNTI, if the NDI field in the DCI is set to zero (e.g., NDI=0), the DCI is meant for activation or deactivation of the UL CG (e.g., for type 2 UL CG) and the HARQ ID indicated in the DCI is set to zero. This means that the HARQ ID indicated in the DCI is not to be used. On the other hand, if the NDI field in the DCI is set to 1 (e.g., NDI=1), the DCI is meant for scheduling a PUSCH retransmission of a previous UL CG transmission. In this case, a HARQ process ID indicated in the DCI is used and is generally one of the HARQ IDS configured for UL CG (e.g., same as the HARQ ID used for the previous UL CG transmission).

The current NR standards do not define a similar UE behavior for multi-TTI DCI grants scheduling multiple uplink TTIs/transmissions.

Figure 9:
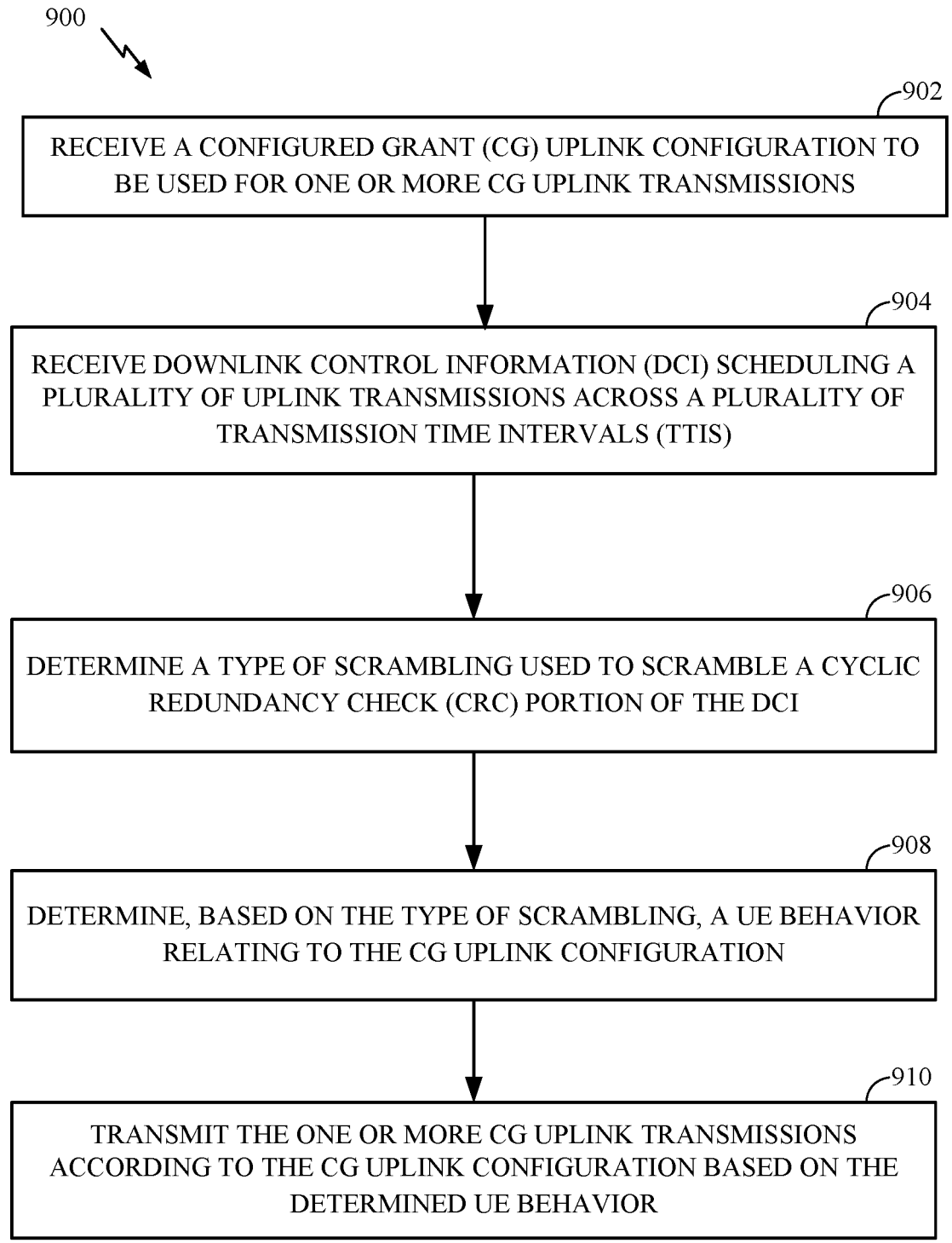
FIG. 9 illustrates example operations 900 performed by a UE based on a type of scrambling used for a DCI that schedules multiple TTIs/transmissions, in accordance with certain aspects of the present disclosure.

FIG. 9 illustrates example operations 900 performed by a UE based on a type of scrambling used for a DCI that schedules multiple TTIs/transmissions, in accordance with certain aspects of the present disclosure.

Operations 900 begin, at 902, by receiving a UL CG configuration to be used for one or more UL CG transmissions.

At 904, the UE receiving downlink control information (DCI) scheduling a plurality of uplink transmissions across a plurality of TTIs (e.g., UL PUSCH transmissions).

At 906, the UE determines a type of scrambling used to scramble a CRC portion of the DCI.

At 908, the UE determines, based on the type of scrambling, a UE behavior relating to the UL CG configuration.

At 910, the UE transmits the one or more UL CG uplink transmissions according to the UL CG configuration based on the determined UE behavior.

Figure 10:
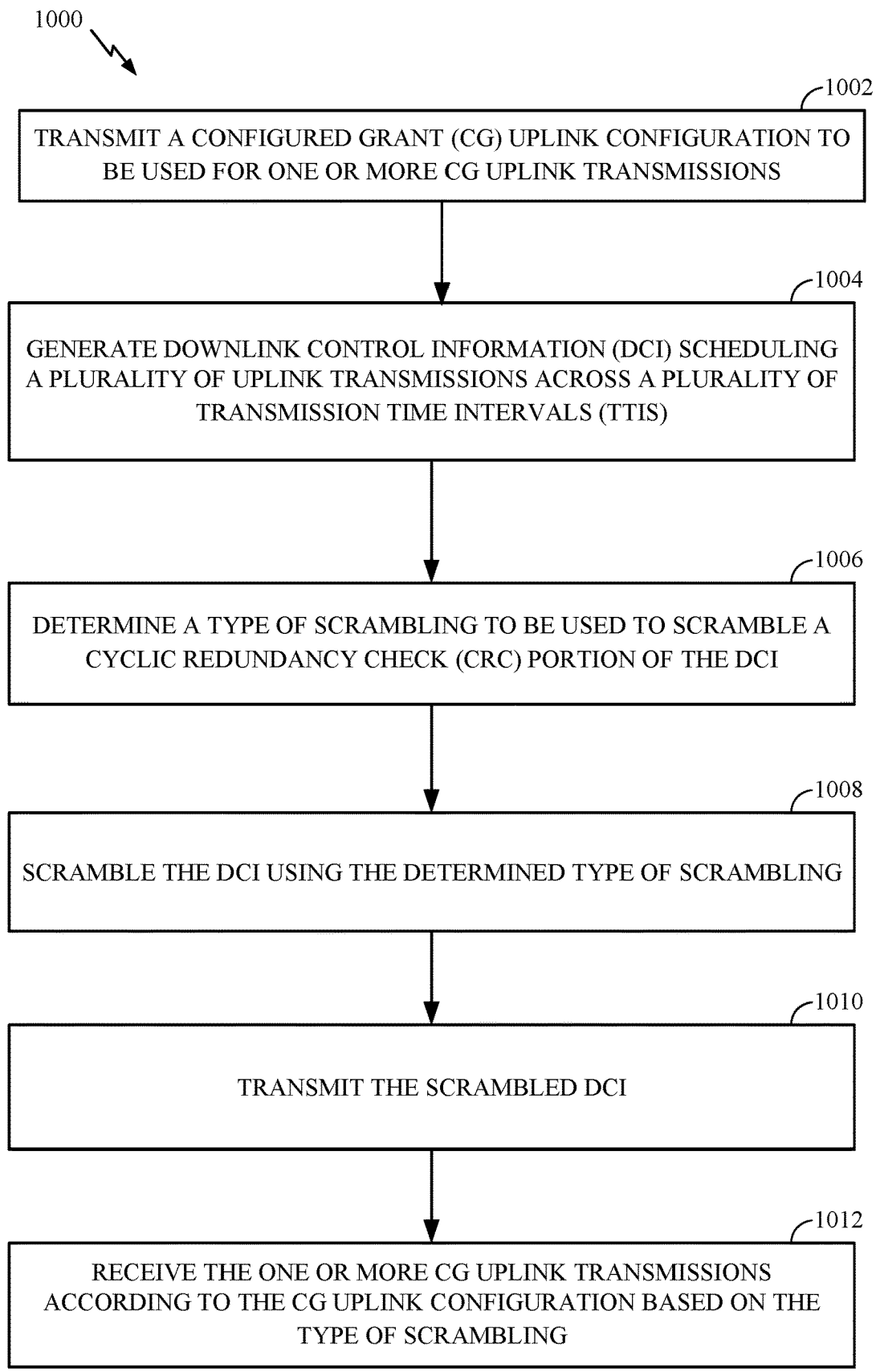
FIG. 10 illustrates example operations 1000 performed by a BS (e.g., gNB, TP, DU) based on a type of scrambling used for a DCI that schedules multiple TTIs/transmissions, in accordance with certain aspects of the present disclosure.

FIG. 10 illustrates example operations 1000 performed by a BS (e.g., gNB, TP, DU) based on a type of scrambling used for a DCI that schedules multiple TTIs/transmissions, in accordance with certain aspects of the present disclosure.

Operations 1000 begin, at 1002, by transmitting a UL CG configuration to be used for one or more UL CG transmissions.

At 1004, the BS generates DCI scheduling a plurality of uplink transmissions across a plurality of TTIs.

At 1006, the BS determines a type of scrambling to be used to scramble a CRC portion of the DCI.

At 1008, the BS scrambles the DCI using the determined type of scrambling;

At 1010, the BS transmits the scrambled DCI.

At 1012, the BS receives the one or more UL CG transmissions according to the UL CG configuration based on the type of scrambling.

As noted above, the DCI schedules each TTI for a different transmission (e.g., PUSCH transmission) associated with a different HARQ process ID.

In certain aspects, multi-TTI DCI may be scrambled only with C-RNTI and the UE does not monitor multi-TTI DCI format with CS-RNTI. In this context, for each PUSCH transmission of the PUSCH transmissions scheduled by the multi-TTI DCI the gNB and UE behavior may be similar to the gNB/UE behavior defined in Release 15 for single-TTI transmissions. For example, for each scheduled grant-based PUSCH transmission if the transmission overlaps with an UL CG transmission, the grant-based transmission takes priority and the UE does not transmit the CG UL transmission. Further, for each scheduled grant-based PUSCH transmission, if the HARQ ID assigned to the PUSCH transmission (e.g., based on the starting PUSCH HARQ ID indicated in the DCI) is one of the HARQ IDs configured for UL CG, the UE does not transmit the UL CG transmission corresponding to the same HARQ ID within a pre-configured time period, even if the UL CG transmission occasion corresponding to the HARQ ID does not overlap with the grant-based transmission occasion.

In certain aspects, a multi-TTI DCI may be scrambled with either C-RNTI or CS-RNTI and the gNB/UE behavior may be determined based on the type of scrambling used for the DCI.

In an aspect, when the UE detects that the DCI is scrambled with C-RNTI, the UE follows the same behavior descried above.

In an aspect, when the UE detects that the DCI is scrambled with CS-RNTI, the UE behavior is decided based on the NDI field of the DCI.

In an aspect, when all NDI bits are set to zero, the UE determines that the DCI activates or deactivates UL CG transmissions on corresponding UL CG occasions. In this case, the UE does not use the HARQ process ID indicated in the DCI. In an aspect, HARQ ID for a particular UL CG transmission may be assigned based on a position of a corresponding UL CG occasion for the particular UL CG transmission.

In this context, a new form for multi-TTI UL CG transmission may be defined that is different from the UL CG transmission currently defined in the NR standards.

Figure 11:
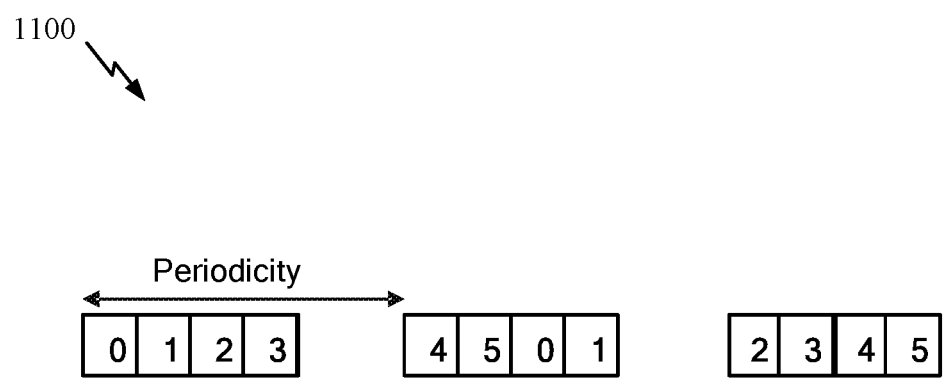
FIG. 11 illustrates an example new form 1100 of multi-TTI UL CG transmission, in accordance with certain aspects of the present disclosure.

FIG. 11 illustrates an example new form 1100 of multi-TTI UL CG transmission, in accordance with certain aspects of the present disclosure.

As shown in FIG. 11, multiple CG UL transmissions may be configured on corresponding CG UL occasions in each period with a predetermined configured periodicity. In an aspect, when the DCI is scrambled with CS-RNTI, HARQ ID is assigned to each of the UL CG uplink transmissions based on a position of a corresponding CG uplink occasion of the CG uplink transmission. Further, each assigned HARQ ID is from a set of HARQ IDs configured for the CG uplink transmissions. For example, for the example UL CG configuration shown in FIG. 11, the configured set of HARQ process IDs includes HARQ IDs 0-5. Thus, as shown in FIG. 11, the UL CG occasions are assigned HARQ process IDs 0-5 across the transmission periods with modulo operation within the set of configured HARQ IDs.

In an aspect, when the UE detects the multi-TTI grant DCI is scrambled with CS-RNTI and when all NDI bits are set to 1, the UE determines that the DCI schedules one or more UL CG retransmissions (e.g., PUSCH retransmissions) of previous UL CG transmissions. In this context, the multi-TTI grant DCI includes a starting HARQ process ID to be assigned to a first one of the UL CG retransmissions, and wherein HARQ IDs are assigned to each subsequent one of the UL CG retransmissions by incrementing the HARQ ID by one for the subsequent retransmission. Further, modulo operation is performed within a set of HARQ IDs configured for the CG uplink configuration. In an aspect, multiple PUSCH retransmissions scheduled by the multi-TTI grant DCI may correspond to multiple previous UL CG transmissions across different periods of a multi-TTI UL CG transmission. For example, referring to FIG. 11, the DCI may schedule retransmissions for initial UL CG transmissions from multiple periods (e.g., with HARQ IDs (0,1) from the first period and HARQ IDs (4,5) from the second period). In an alternative aspect, multiple PUSCH retransmissions scheduled by the multi-TTI grant DCI may correspond to multiple previous UL CG transmissions of a single period of a multi-TTI UL CG transmission. For example, referring to FIG. 11, the multi-TTI DCI may schedule retransmissions of initial transmissions from the first period only.

In an aspect, when the UE detects the multi-TTI grant DCI is scrambled with CS-RNTI and when some NDI bits are set to 1 and other are set to 0, the UE ignores the DCI.

CBGTI Indication Using Unused Bits in Multi-TTI Grant

In certain aspects, a multi-TTI grant does not always schedule the maximum number of transmissions (N) that can be scheduled by the multi-TTI grant. As noted above, the multi-TTI grant DCI can schedule n<=N transmissions. For example, the DCI may indicate n=1 and schedule only one PUSCH transmission. Current NR standards have not agreed on CBGTI indication in multi-TTI grant DCI.

In certain aspects, as noted above certain fields (e.g., NDI and RV) in the multi-TTI DCI may have a fixed size (e.g., fixed bit width) that is a function the maximum number of transmissions (RRC parameter N) that can be scheduled by a multi-TTI grant DCI. Thus, regardless of how many transmissions (n) of the maximum number of transmissions (N) are actually scheduled by the multi-TTI grant DCI, the NDI and RV fields have the same number of bits. However, if only a portion of the N allowed transmissions are scheduled by the multi-TTI grant DCI (e.g., n<N), some bits of each of the NDI and RV fields may go unused. For example, when N=4, but n=1, NDI field has 4 bits (one bit per N PUSCH transmissions), and RV field can have 4 bits or 8 bits (one bit or 2 bits per N PUSCH transmissions). In this case, since only one PUSCH is scheduled, 3 bits of the NDI field is not used, and 3 bits or 6 bits of the RV field is not used.

In certain aspects, if multi-TTI DCI schedules only a portion of the maximum allowed PUSCH transmission (e.g., when n<N), certain unused DCI bits can be interpreted as CBGTI bits for the scheduled transmissions. For example, when only one PUSCH transmission is scheduled (e.g., when n=1), the unused bits some or all of the unused bits from the RV and NDI fields can be interpreted as CBGTI for the scheduled PUSCH transmission.

Figure 12:
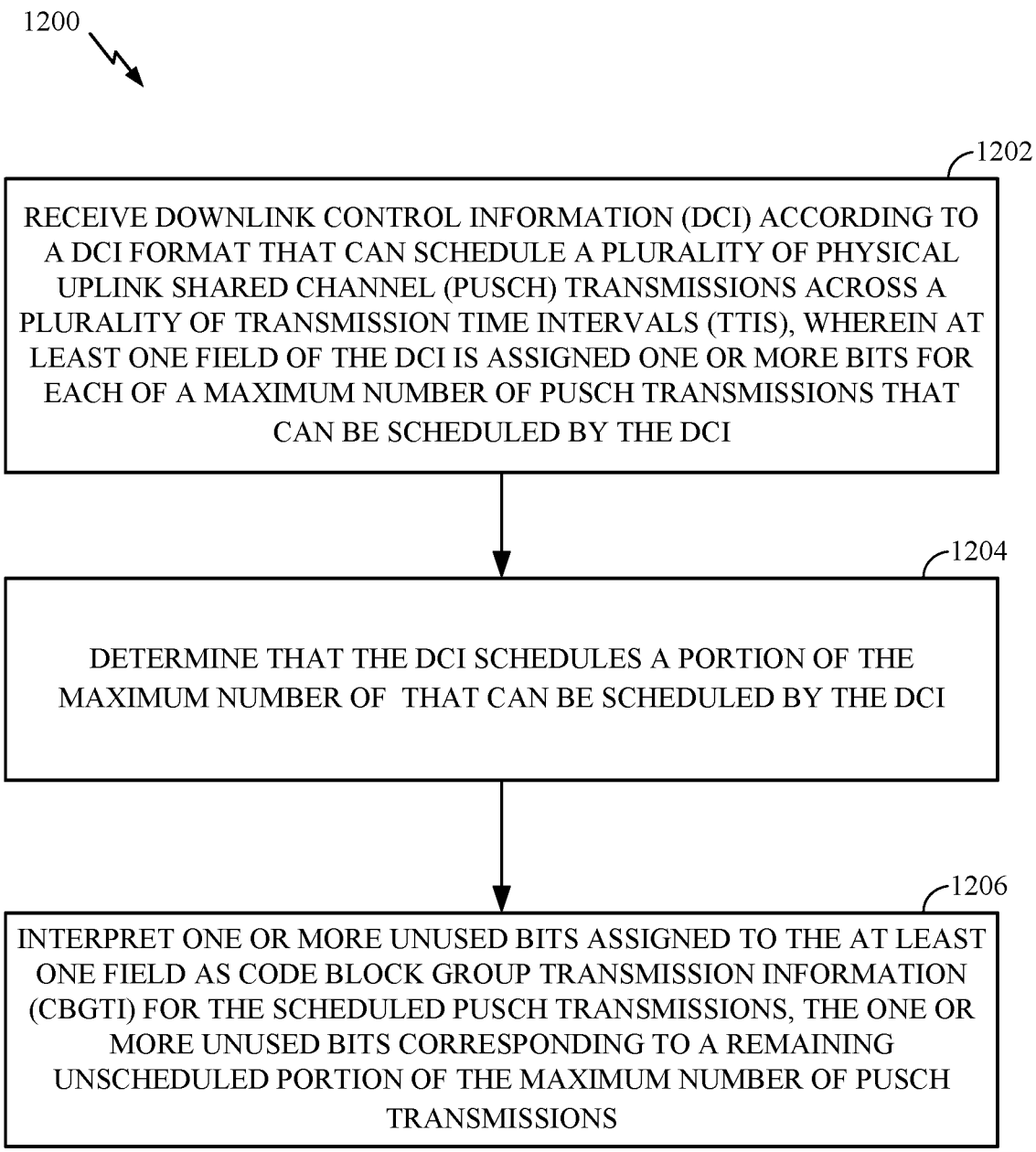
FIG. 12 illustrates example operations 1200 performed by a UE for CBGTI indication using unused bits in a multi-TTI grant, in accordance with certain aspects of the present disclosure.

FIG. 12 illustrates example operations 1200 performed by a UE for CBGTI indication using unused bits in a multi-TTI grant, in accordance with certain aspects of the present disclosure.

Operations 1200 begin, at 1202, by receiving downlink control information (DCI) according to a DCI format that can schedule a plurality of physical uplink shared channel (PUSCH) transmissions across a plurality of transmission time intervals (TTIs), wherein at least one field of the DCI is assigned one or more bits for each of a maximum number of PUSCH transmissions that can be scheduled by the DCI.

At 1204, the UE determines that the DCI schedules a portion of the maximum number of PUSCH transmissions that can be scheduled by the DCI.

At 1206, the UE interprets one or more unused bits assigned to the at least one field as code block group transmission information (CBGTI) for the scheduled PUSCH transmissions, the one or more unused bits corresponding to a remaining unscheduled portion of the maximum number of PUSCH transmissions. In an aspect, the at least one field includes at least one of an NDI or an RV.

Figure 13:
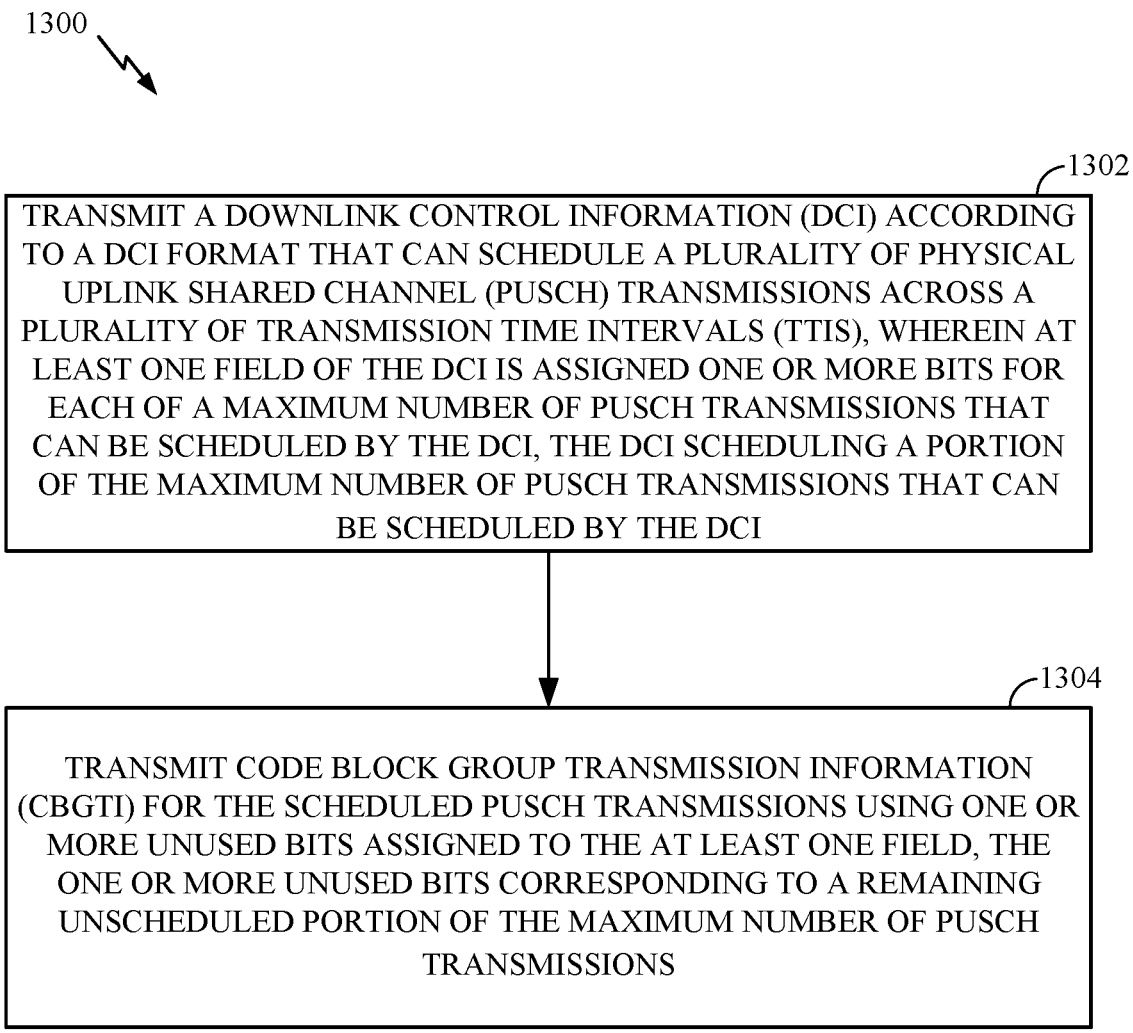
FIG. 13 illustrates example operations 1300 performed by a BS (e.g., gNB, TP, DU) for CBGTI indication using unused bits in a multi-TTI grant, in accordance with certain aspects of the present disclosure.

FIG. 13 illustrates example operations 1300 performed by a BS (e.g., gNB, TP, DU) for CBGTI indication using unused bits in a multi-TTI grant, in accordance with certain aspects of the present disclosure.

Operations 1300 begin, at 1302, by transmitting a downlink control information (DCI) according to a DCI format that can schedule a plurality of physical uplink shared channel (PUSCH) transmissions across a plurality of transmission time intervals (TTIs), wherein at least one field of the DCI is assigned one or more bits for each of a maximum number of PUSCH transmissions that can be scheduled by the DCI, the DCI scheduling a portion of the maximum number of PUSCH transmissions that can be scheduled by the DCI. In an aspect, the portion includes one PUSCH transmission. In an aspect, the at least one field includes at least one of an NDI or an RV.

At 1304, the BS transmits code block group transmission information (CBGTI) for the scheduled PUSCH transmissions using one or more unused bits assigned to the at least one field, the one or more unused bits corresponding to a remaining unscheduled portion of the maximum number of PUSCH transmissions.

In certain aspects, how many of the unused bits (e.g., unused RV and NDI bits) are used/interpreted for CBGI of scheduled transmissions may be based on a maximum number of code block groups configured per TB. In an aspect, according to the NR standards, the maximum number of code block groups configured per TB is given by the RRC parameter "maxCodeBlockGroupsPerTransportBlock". For example, for DCI format 0_1, the length of the CBGTI field can be 0, 2, 4, 6 or 8 as determined by the parameter "maxCodeBlockGroupsPerTransportBlock".

The same DCI format 0_1 can schedule a single PUSCH or multiple PUSCHs. The maximum number of PUSCHs that the DCI can schedule may be determined by a time domain resource allocation table (the maximum may be configured as 8). In this manner, the number of NDI bits and RV bits in DCI format 0_1 may be determined based on the configured TDRA table. For example, there may be 1 RV bit per PUSCH, in case multiple PUSCHs are scheduled or 2 RV bits for the PUSCH in case only a single PUSCH is scheduled.

The payload size of DCI format 0_1 may be determined based on the largest of the DCI size scheduling one PUSCH or the DCI size scheduling multiple PUSCHs, based on the configured TDRA table. When UL DCI 0_1 schedules more than one PUSCH, an uplink shared channel (UL-SCH) indicator field may not be present and a CBGTI field (e.g., as there may be no unused bits) may not be present. When UL DCI 0_1 schedules a single PUSCH, the UL-SCH indicator field may be present and the CBGTI field (unused bits that would have carried information if multiple PUSCHs were scheduled) may be present.

In certain aspects, a number of code block groups may be determined for the scheduled TTIs based on the number of unused bits. In an aspect, the number of unused bits depends on the RRC parameter N as well as DCI design for multi-TTI grant.

CSI Reporting Field in Multi-TTI Grant

As noted in the above paragraphs, the NR standards define a Channel State Information (CSI) request field in the DCI that requests a CSI feedback. The CSI request field generally applies to a single PUSCH transmission. In accordance with 3GPP Release 15, UE CSI computation time for an aperiodic CSI report (e.g., requested by a CSI request field in DCI format 0_1) is based on processing times Z and Z'. The parameter Z represents Z symbols after the end of a last symbol of a PDCCH that triggers the CSI report. The parameter Z' represents Z' symbols after the end of a last symbol of the latest aperiodic CS_RS, CSI-IM, or NZP CSI-RS that is used for channel/interference measurements for generating the CSI report. According to the NR standards, when the CSI request field in DCI 0_1 triggers a CSI report in a scheduled PUSCH transmission, the UE is to provide a valid CSI report if the first symbol of the PUSCH transmission starts Z symbols after the end of a last symbol of a PDCCH that triggers the CSI report, and if the first symbol of the PUSCH transmission starts Z' symbols after the end of a last symbol of the latest aperiodic CS_RS, CSI-IM, or NZP CSI-RS that is used for channel/interference measurements for generating the CSI report. In an aspect, the values of Z and Z' depend on UE reported capability, subcarrier spacing, type of CSI report and other factors.

In the context of multi-TTI grants, there is no agreement in NR regarding a relation between timing of the CSI request field triggering the CSI report and the CSI-RS used for measurements to generate the CSI report, with timing of the PUSCH carrying the CSI feedback, and how to determine which PUSCH of the multiple scheduled PUSCHs carries the CSI feedback.

Figure 14:
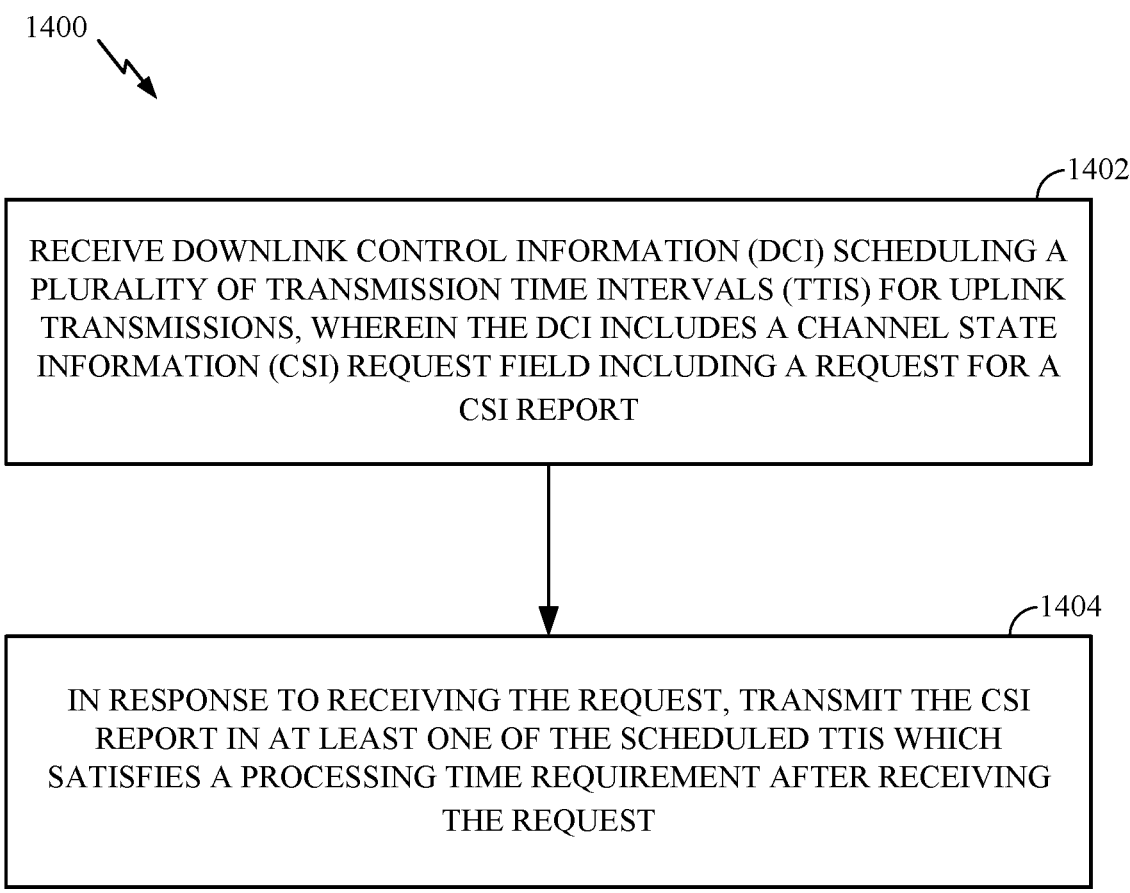
FIG. 14 illustrates example operations 1400 performed by a UE for transmitting CSI reports based on a CSI request field in a multi-TTI grant, in accordance with certain aspects of the present disclosure.

FIG. 14 illustrates example operations 1400 performed by a UE for transmitting CSI reports based on a CSI request field in a multi-TTI grant, in accordance with certain aspects of the present disclosure.

Operations 1400 begin, at 1402, by receiving DCI scheduling a plurality of TTIs for uplink transmissions, wherein the DCI includes a CSI request field including a request for a CSI report.

At 1404, the UE, in response to receiving the request, transmits the CSI report in at least one of the scheduled TTIs which satisfies a processing time requirement after receiving the request.

Figure 15:
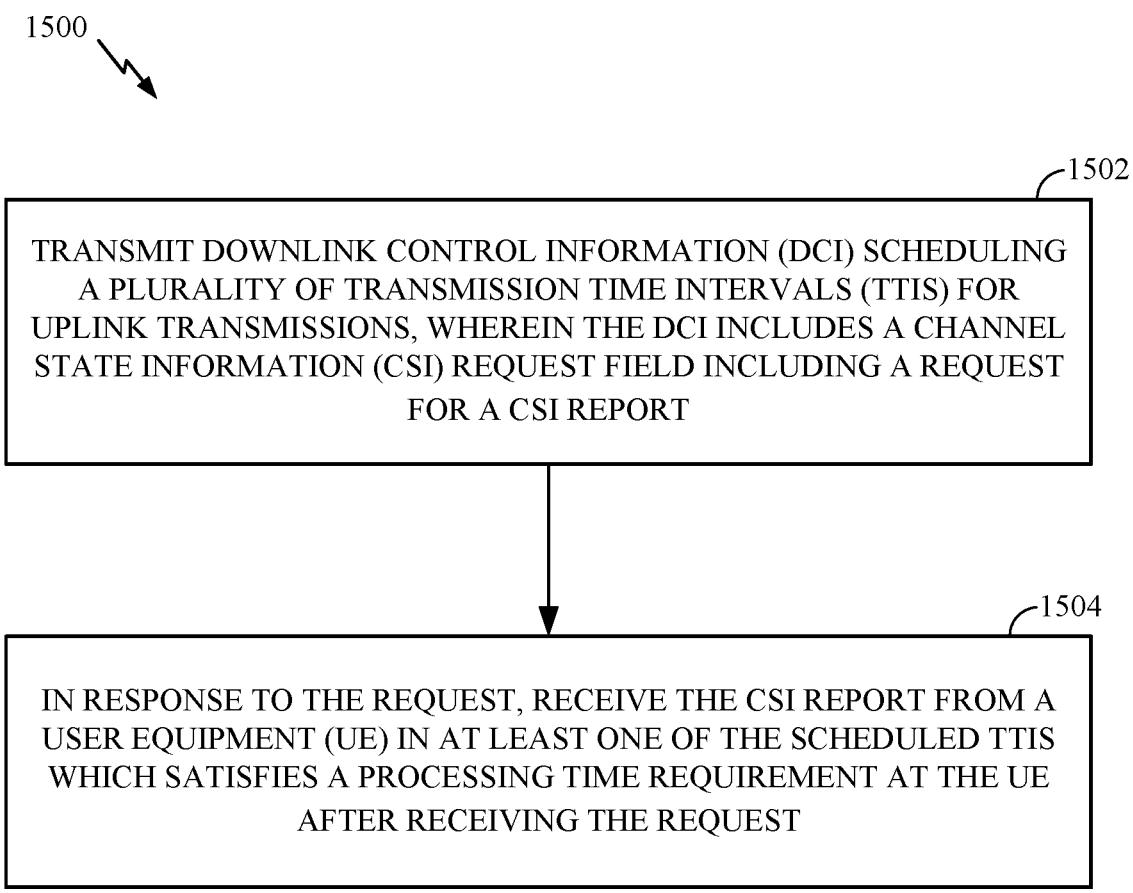
FIG. 15 illustrates example operations 1500 performed by a BS (e.g., gNB, TP, DU) for receiving CSI reports based on a CSI request field in a multi-TTI grant, in accordance with certain aspects of the present disclosure.

FIG. 15 illustrates example operations 1500 performed by a BS (e.g., gNB, TP, DU) for receiving CSI reports based on a CSI request field in a multi-TTI grant, in accordance with certain aspects of the present disclosure.

Operations 1500 begin, at 1502, by transmitting DCI scheduling a plurality of TTIs for uplink transmissions, wherein the DCI includes a CSI request field including a request for a CSI report.

At 1504, the BS, in response to the request, receives the CSI report from a UE in at least one of the scheduled TTIs which satisfies a processing time requirement after receiving the request.

In certain aspects, in the context of multi-TTI grants, if a CSI request field in the multi-TTI grant DCI triggers a CSI report, the CSI report may transmitted by the UE in a first PUSCH transmission among the scheduled PUSCH transmissions that meet both the Z and Z' processing time requirements.

In alternative aspects, the UE may transmit the CSI report always in the last scheduled PUSCH transmission, given that both the Z and Z' processing time requirements are satisfied.

Figure 16:
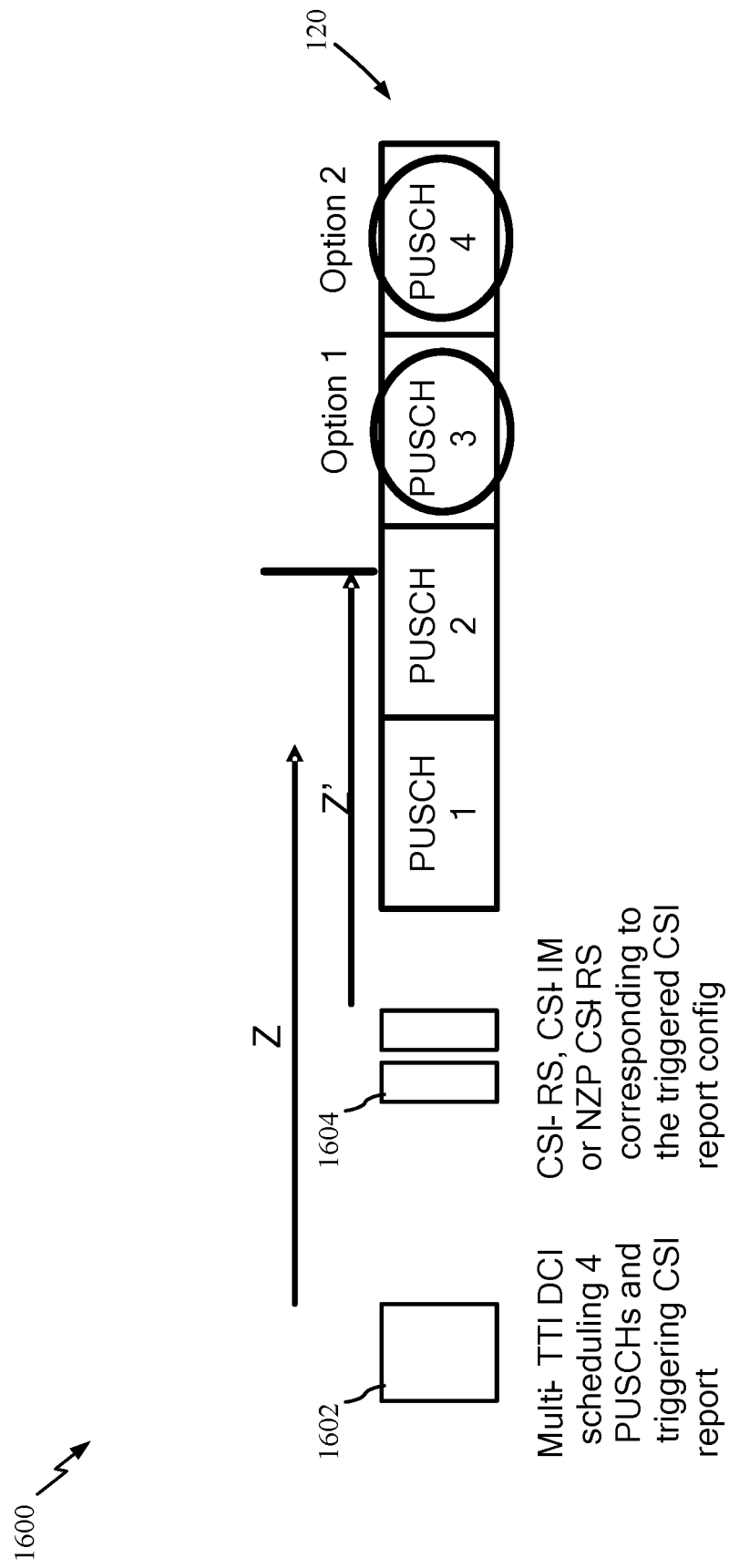
FIG. 16 illustrates an example CSI report transmission 1600 triggered by a CSI request field in a multi-TTI grant, in accordance with certain aspects of the present disclosure.

FIG. 16 illustrates an example CSI report transmission 1600 triggered by a CSI request field in a multi-TTI grant, in accordance with certain aspects of the present disclosure.

As shown in FIG. 16, a multi-TTI grant DCI 1602 schedules 4 PUSCH transmissions 1610 and also transmits a CSI request field triggering a CSI report. As shown, the UE may transmit the CSI report in PUSCH 3 (shown as Option 1) which is the first scheduled PUSCH transmission that satisfies both the Z and Z' processing time requirements. Additionally or alternatively, the UE may transmit the CSI report in the last scheduled PUSCH transmission (shown as Option 2) which also satisfies both the Z and Z' processing time requirements.

Example Embodiments

Embodiment 1: An apparatus for wireless communications, comprising a memory; and a processor coupled with the memory, the memory and the processor configured to: receive downlink control information (DCI) according to a DCI format that can schedule a plurality of physical uplink shared channel (PUSCH) transmissions across a plurality of transmission time intervals (TTIs), wherein at least one field of the DCI is assigned one or more bits for each of a maximum number of PUSCH transmissions that can be scheduled by the DCI; determine that the DCI schedules a portion of the maximum number of PUSCH transmissions that can be scheduled by the DCI; and interpret one or more unused bits assigned to the at least one field as code block group transmission information (CBGTI) for the scheduled PUSCH transmissions, the one or more unused bits corresponding to a remaining unscheduled portion of the maximum number of PUSCH transmissions.

Embodiment 2: The apparatus of Embodiment 1, wherein the portion comprises one PUSCH transmission.

Embodiment 3: The apparatus of any of Embodiments 1-2, wherein the at least one field comprises at least one of a new data indicator (NDI) or a redundancy version (RV).

Embodiment 4: The apparatus of any of Embodiments 1-3, wherein the memory and the processor are further configured to determine a number of the unused bits to be interpreted as the CBGTI, based on a maximum number of code block groups (CBGs) configured per transport block (TB).

Embodiment 5: The apparatus of any of Embodiments 1-4, wherein the memory and the processor are further configured to determine a number of code block groups for the scheduled PUSCH transmissions based on the number of the unused bits.

Embodiment 6: An apparatus for wireless communications, comprising a memory; and a processor coupled with the memory, the memory and the processor configured to: transmit a downlink control information (DCI) according to a DCI format that can schedule a plurality of physical uplink shared channel (PUSCH) transmissions across a plurality of transmission time intervals (TTIs), wherein at least one field of the DCI is assigned one or more bits for each of a maximum number of PUSCH transmissions that can be scheduled by the DCI, the DCI scheduling a portion of the maximum number of PUSCH transmissions that can be scheduled by the DCI; and transmit code block group transmission information (CBGTI) for the scheduled PUSCH transmissions using one or more unused bits assigned to the at least one field, the one or more unused bits corresponding to a remaining unscheduled portion of the maximum number of PUSCH transmissions.

Embodiment 7: The apparatus of Embodiment 6, wherein the portion comprises one PUSCH transmission.

Embodiment 8: The apparatus of any of Embodiments 6-7, wherein the at least one field comprises at least one of a new data indicator (NDI) or a redundancy version (RV).

Embodiment 9: The apparatus of any of Embodiments 6-8, wherein the memory and the processor are further configured to determine a number of the unused bits to use for the CBGTI, based on a maximum number of code block groups configured per transport block (TB).

Embodiment 10: The apparatus of any of Embodiments 6-9, wherein the memory and the processor are further configured to determine a number of code block groups for the scheduled PUSCH transmissions based on the number of the unused bits.

Embodiment 11: An apparatus for wireless communications, comprising: a memory; and a processor coupled with the memory, the memory and the processor configured to: receive a configured grant (CG) uplink configuration to be used for one or more CG uplink transmissions; receive downlink control information (DCI) scheduling a plurality of uplink transmissions across a plurality of transmission time intervals (TTIs); determine a type of scrambling used to scramble a Cyclic Redundancy Check (CRC) portion of the DCI; determine, based on the type of scrambling, a UE behavior relating to the CG uplink configuration; and transmit the one or more CG uplink transmissions according to the CG uplink configuration based on the determined user equipment (UE) behavior.

Embodiment 12: The apparatus Embodiment 11, wherein each TTI is scheduled for a different one of the transmissions associated with a different hybrid automatic repeat request (HARQ) process identifier (ID).

Embodiment 13: The apparatus of any of Embodiments 11-12, wherein determining a type of scrambling comprises determining that the CRC portion of the DCI is scrambled with a Cell-Radio Network Temporary Identifier (C-RNTI), further comprising determining, based on the type of scrambling, that each of the transmissions scheduled by the DCI includes a grant based transmission.

Embodiment 14: The apparatus of any of Embodiments 11-13, wherein the UE behavior comprises: for each scheduled grant based transmission, when the grant based transmission overlaps with a CG uplink occasion of the CG uplink configuration, deciding not to transmit a corresponding CG uplink transmission in the CG uplink occasion.

Embodiment 15: The apparatus of Embodiment 13, wherein the UE behavior comprises: for each scheduled grant based transmission, when a hybrid automatic repeat request (HARQ) process identifier (ID) of the scheduled grant based transmission is one of HARQ process IDs configured for the CG uplink transmissions, deciding not to transmit a corresponding CG uplink transmission having the same HARQ process ID within a predetermined time period.

Embodiment 16: The apparatus of any of Embodiments 11-15, wherein determining a type of scrambling comprises determining that the CRC portion of the DCI is scrambled with Configured Scheduling-Radio Network Temporary Identifier (CS-RNTI).

Embodiment 17: The apparatus of Embodiment 16, wherein the UE behavior comprises: when all bits in a New Data Indicator (NDI) field of the DCI are set to zero: determining that the DCI activates or deactivates CG uplink transmissions of the CG uplink configuration on corresponding CG uplink occasions, and determining not to use a (HARQ) process identifier (ID) indicated by the DCI.

Embodiment 18: The apparatus of Embodiment 17, wherein the CG uplink configuration configures multiple different CG uplink transmissions in each period.

Embodiment 19: The apparatus of Embodiment 18, wherein the memory and the processor are further configured to assign a HARQ ID to each of the CG uplink transmissions based on a position of a corresponding CG uplink occasion of the CG uplink transmission, wherein each assigned HARQ ID is from a set of HARQ IDs configured for the CG uplink transmissions.

Embodiment 20: The apparatus of any of Embodiments 11-19, wherein the UE behavior comprises: when all bits in a New Data Indicator (NDI) field of the DCI are set to one, determining that the DCI schedules one or more retransmissions of corresponding one or more CG uplink transmissions.

Embodiment 21: The apparatus of Embodiment 20, wherein the DCI includes a starting (HARQ) process identifier (ID) to be assigned to a first one of the retransmissions, and wherein HARQ IDs are assigned to each subsequent one of the retransmissions by incrementing the HARQ ID by one for the subsequent transmission and by performing a modulo operation within a set of HARQ IDs configured for the CG uplink configuration.

Embodiment 22: The apparatus of Embodiment 21, wherein the one or more scheduled retransmissions comprise multiple retransmissions corresponding to multiple CG uplink transmissions previously transmitted in different periods as defined by the CG uplink configuration.

Embodiment 23: The apparatus of any of Embodiments 11-22, wherein the one or more scheduled retransmissions comprise multiple retransmissions corresponding to multiple CG uplink transmissions previously transmitted in a single period as defined by the CG uplink configuration.

Embodiment 24: The apparatus of any of Embodiments 11-23, wherein the UE behavior comprises, when a portion of bits of a New Data Indicator (NDI) field of the DCI are set to one and a remaining portion of the bits of the NDI field are set to zero, deciding to ignore the DCI.

Embodiment 25: An apparatus for wireless communications, comprising: a memory; and a processor coupled with the memory, the memory and the processor configured to: transmit a configured grant (CG) uplink configuration to be used for one or more CG uplink transmissions; generate downlink control information (DCI) scheduling a plurality of uplink transmissions across a plurality of transmission time intervals (TTIs); determine a type of scrambling to be used to scramble a Cyclic Redundancy Portion (CRC) portion of the DCI; scramble the DCI using the determined type of scrambling; transmit the scrambled DCI; and receive the one or more CG uplink transmissions according to the CG uplink configuration based on the type of scrambling.

Embodiment 26: The apparatus Embodiment 25, wherein each TTI is scheduled for a different one of the transmissions associated with a different hybrid automatic repeat request (HARQ) process identifier (ID).

Embodiment 27: The apparatus of any of Embodiments 25-26, wherein when the type of scrambling comprises scrambling the CRC portion of the DCI using a Cell-Radio Network Temporary Identifier (C-RNTI), each of the transmissions scheduled by the DCI includes a grant based transmission.

Embodiment 28: The apparatus of Embodiment 27, wherein the memory and the processor are further configured to: for each scheduled grant based transmission, when the grant based transmission overlaps a CG uplink occasion of the CG uplink configuration, not receive a corresponding CG uplink transmission in the CG uplink occasion.

Embodiment 29: The apparatus of any of Embodiments 25-28, wherein the memory and the processor are further configured to: for each scheduled grant based transmission, when a hybrid automatic repeat request (HARQ) process identifier (ID) of the scheduled grant based transmission is one of HARQ process IDs configured for the CG uplink transmissions, not receive a corresponding CG uplink transmission having the same HARQ process ID within a predetermined time period.

Embodiment 30: The apparatus of any of Embodiments 25-29, wherein the type of scrambling comprises scrambling the CRC portion of the DCI using a Configured Scheduling-Radio Network Temporary Identifier (CS-RNTI).

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 4-16.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
    a memory; and
    a processor coupled with the memory, the memory and the processor configured to:
        receive a downlink control information (DCI) that can schedule a plurality of physical uplink shared channel (PUSCH) transmissions across a plurality of transmission time intervals (TTIs), wherein at least one field of the DCI is assigned one or more bits for each of a maximum number of PUSCH transmissions that can be scheduled by the DCI;
        determine that the DCI schedules a portion of the maximum number of PUSCH transmissions that can be scheduled by the DCI; and
        interpret one or more unused bits assigned to the at least one field as code block group transmission information (CBGTI) for the scheduled portion of the maximum number of PUSCH transmissions, the one or more unused bits corresponding to a remaining unscheduled portion of the maximum number of PUSCH transmissions, wherein a number of the one or more unused bits is based on a maximum number of code block groups (CBGs) configured per transport block (TB).

2. The apparatus of claim 1, wherein the portion comprises one PUSCH transmission.

3. The apparatus of claim 1, wherein the at least one field comprises at least one of a new data indicator (NDI) or a redundancy version (RV).

4. The apparatus of claim 1, wherein the memory and the processor are further configured to determine a number of CBGs for the scheduled portion of the maximum number of PUSCH transmissions based on the number of the one or more unused bits.

5. An apparatus for wireless communications, comprising:
    a memory; and
    a processor coupled with the memory, the memory and the processor configured to:
        transmit a downlink control information (DCI) that can schedule a plurality of physical uplink shared channel (PUSCH) transmissions across a plurality of transmission time intervals (TTIs), wherein at least one field of the DCI is assigned one or more bits for each of a maximum number of PUSCH transmissions that can be scheduled by the DCI, the DCI scheduling a portion of the maximum number of PUSCH transmissions that can be scheduled by the DCI; and
        transmit code block group transmission information (CBGTI) for the scheduled portion of the maximum number of PUSCH transmissions using one or more unused bits assigned to the at least one field, the one or more unused bits corresponding to a remaining unscheduled portion of the maximum number of PUSCH transmissions, wherein a number of the one or more unused bits is based on a maximum number of code block groups (CBGs) configured per transport block (TB).

6. The apparatus of claim 5, wherein the portion comprises one PUSCH transmission.

7. The apparatus of claim 5, wherein the at least one field comprises at least one of a new data indicator (NDI) or a redundancy version (RV).

8. The apparatus of claim 5, wherein the memory and the processor are further configured to determine a number of CBGs for the scheduled portion of the maximum number of PUSCH transmissions based on the number of the one or more unused bits.

9. A method for wireless communications, comprising:
    receiving a downlink control information (DCI) that can schedule a plurality of physical uplink shared channel (PUSCH) transmissions across a plurality of transmission time intervals (TTIs), wherein at least one field of the DCI is assigned one or more bits for each of a maximum number of PUSCH transmissions that can be scheduled by the DCI;
    determining that the DCI schedules a portion of the maximum number of PUSCH transmissions that can be scheduled by the DCI; and interpreting one or more unused bits assigned to the at least one field as code block group transmission information (CBGTI) for the scheduled portion of the maximum number of PUSCH transmissions, the one or more unused bits corresponding to a remaining unscheduled portion of the maximum number of PUSCH transmissions, wherein a number of the one or more unused bits is based on a maximum number of code block groups (CBGs) configured per transport block (TB).

10. The method of claim 9, wherein the portion comprises one PUSCH transmission.

11. The method of claim 9, wherein the at least one field comprises at least one of a new data indicator (NDI) or a redundancy version (RV).

12. The method of claim 9, further comprising determining a number of CBGs for the scheduled portion of the maximum number of PUSCH transmissions based on the number of the one or more unused bits.

13. A method for wireless communications, comprising:
transmitting a downlink control information (DCI) that can schedule a plurality of physical uplink shared channel (PUSCH) transmissions across a plurality of transmission time intervals (TTIs), wherein at least one field of the DCI is assigned one or more bits for each of a maximum number of PUSCH transmissions that can be scheduled by the DCI, the DCI scheduling a portion of the maximum number of PUSCH transmissions that can be scheduled by the DCI; and transmitting code block group transmission information (CBGTI) for the scheduled portion of the maximum number of PUSCH transmissions using one or more unused bits assigned to the at least one field, the one or more unused bits corresponding to a remaining unscheduled portion of the maximum number of PUSCH transmissions, wherein a number of the one or more unused bits is based on a maximum number of code block groups (CBGs) configured per transport block (TB).

14. The method of claim 13, wherein the portion comprises one PUSCH transmission.

15. The method of claim 13, wherein the at least one field comprises at least one of a new data indicator (NDI) or a redundancy version (RV).

16. The method of claim 13, further comprising determining a number of CBGs for the scheduled portion of the maximum number of PUSCH transmissions based on the number of the one or more unused bits.

* * * * *